Sept. 11, 1951 F. A. MORRIS 2,567,650

AUTOMATIC TELEPHONE SYSTEM

Filed April 23, 1947 16 Sheets-Sheet 1

INVENTOR.
FRANK A. MORRIS

BY J. L. Bowes

ATTORNEY

INVENTOR.
FRANK A. MORRIS
BY T. L. Bowes
ATTORNEY

INVENTOR.
FRANK A. MORRIS
BY J. L. Bowes
ATTORNEY

Sept. 11, 1951 F. A. MORRIS 2,567,650

AUTOMATIC TELEPHONE SYSTEM

Filed April 23, 1947 16 Sheets-Sheet 4

INVENTOR.
FRANK A. MORRIS
BY
T. L. Bowes
ATTORNEY

Sept. 11, 1951 F. A. MORRIS 2,567,650

AUTOMATIC TELEPHONE SYSTEM

Filed April 23, 1947 16 Sheets-Sheet 5

INVENTOR.
FRANK A. MORRIS
BY
T. L. Bowes
ATTORNEY

Sept. 11, 1951 F. A. MORRIS 2,567,650

AUTOMATIC TELEPHONE SYSTEM

Filed April 23, 1947 16 Sheets-Sheet 6

INVENTOR.
FRANK A. MORRIS

BY T. L. Bowes

ATTORNEY

INVENTOR.
FRANK A. MORRIS
BY
J. L. Bowes
ATTORNEY

INVENTOR.
FRANK A. MORRIS
BY J. L. Bowes
ATTORNEY

INVENTOR.
FRANK A. MORRIS
BY
T. L. Bowes
ATTORNEY

Sept. 11, 1951 F. A. MORRIS 2,567,650

AUTOMATIC TELEPHONE SYSTEM

Filed April 23, 1947 16 Sheets-Sheet 10

INVENTOR.
FRANK A. MORRIS

BY T. L. Bowes

ATTORNEY

AUTOMATIC TELEPHONE SYSTEM

Filed April 23, 1947 16 Sheets-Sheet 11

INVENTOR.
FRANK A. MORRIS

BY T. L. Bowes

ATTORNEY

Sept. 11, 1951 F. A. MORRIS 2,567,650

AUTOMATIC TELEPHONE SYSTEM

Filed April 23, 1947 16 Sheets-Sheet 12

INVENTOR.
FRANK A. MORRIS

BY T. L. Bowes

ATTORNEY

INVENTOR.
FRANK A. MORRIS
BY T. L. Bowes
ATTORNEY

INVENTOR.
FRANK A. MORRIS
BY
T. L. Bowes
ATTORNEY

INVENTOR.
FRANK A. MORRIS
BY T. L. Bowes
ATTORNEY

INVENTOR.
FRANK A. MORRIS
BY T. L. Bowes
ATTORNEY

Patented Sept. 11, 1951

2,567,650

UNITED STATES PATENT OFFICE 2,567,650

AUTOMATIC TELEPHONE SYSTEM

Frank A. Morris, Rochester, N. Y., assignor to Stromberg-Carlson Company, a corporation of New York Application April 23, 1947, Serial No. 743,415

40 Claims. (Cl. 179—18)

Figure 1:
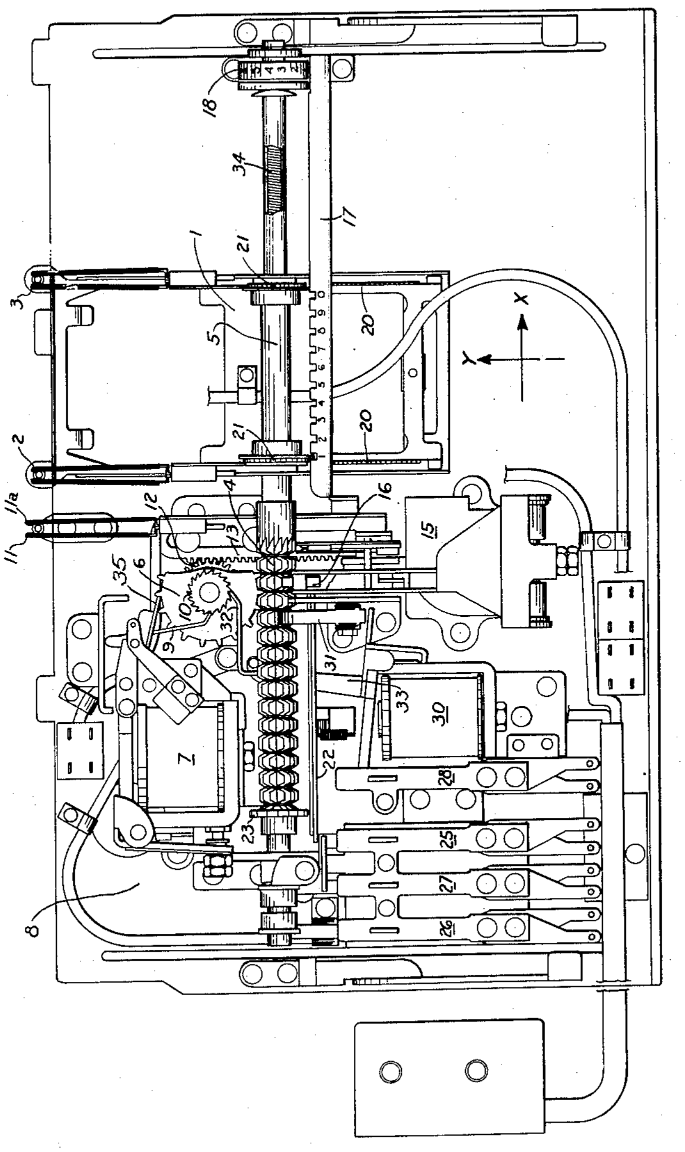

The present invention relates to telephone systems and more particularly to automatic telephone systems of the step-by-step type.

Step-by-step dial telephone systems comprise the familiar subscriber's telephone instrument equipped with a dial together with central office switching equipment. The switching equipment may include either a line switch individual to each subscriber's line or a line finder common to more than one subscriber's line, for determining the calling line, means such as an allotter for designating or selecting a finder switch to make the line finding operation, if line finders are employed, one or more selecting units for selecting an idle one of a desired group of connector units, and one or more connector units for choosing the called line. Such a system may also include a plurality of step switches which are driven by magnets individual to each switch and which may be controlled directly by pulses of voltage sent out from the calling subscriber's station in response to the operation of the subscriber's dial. After the individual line switch has operated to select an idle first selector or after an idle line finder has operated to find the calling subscriber's line and thereby connect him through to an associated idle first selector, dial tone is received and the subscriber proceeds to dial the wanted number. The first digit dialed sets the wipers of the first selector opposite the level corresponding to the digit dialed, whereupon a hunting action takes place to select a trunk to an idle second selector or to the next switching unit in the switch train. Now, the second digit is dialed and the wipers of the second selector or the next switching unit, as the case may be, are set opposite the level corresponding to the digit dialed and a hunting action again takes place in exactly the same manner as in the case of the first selector. The procedure is repeated until all of the selections are made excepting that to the individual subscriber's line and his particular ringing frequency or code, if he is one of several on a party line. In the case of a single party line, the two remaining digits of the called subscriber's number are dialed and the wipers of the connector switch are set, successively, opposite the level corresponding to the tens digit of the called line and then on the contacts corresponding to the units digit of the called line, whereupon ringing of the called line takes place. In the event that the called subscriber is one of several persons on a party line, a final frequency or code selecting digit is dialed by the calling subscriber and an additional selector switch associated with the connector is operated to select the desired means of ringing the bell at the called station.

It can be seen from the foregoing that each "rank selection" is sufficient unto itself, that is, the subscriber dials a digit and the entire ensuing operation is performed completely within the switching circuit in question. A series of relays, associated with that switch, operate and in turn transmit the impulses received from the calling subscriber's dial to the stepping magnets of the switch which, in turn, set the wipers opposite the level corresponding to the digit dialed. In the case of the connector, similar operations take place except that, unlike the "rank selection" switches, the wipers of the connector are set on the particular contact dialed, completely under the control of the calling subscriber's dial, there being no hunting action over the contacts of the particular level selected.

The line finder is a non-numerical switch, that is, it performs neither a level-selecting operation nor a contact-selecting operation under the control of the calling subscriber's dial. This switch is started by the removal of the handset of the telephone at the calling subscriber's station, and the wipers are operated to connect to the calling line without that subscriber's intervention. Line switches perform in a similar manner, except that they are individual to the calling line rather than common to a group of calling lines.

It is an object of my invention to provide a new and improved automatic telephone system of the foregoing type which is economical not only in first cost but also with respect to maintenance charges, which is relatively trouble free in operation, and which contains new and improved features.

Another object of my invention is to provide an automatic telephone system employing new and improved methods and apparatus for handling trunk calls on a different basis than calls originating with subscribers' lines. In accomplishing this object of my invention, there are provided separate line and trunk start leads to an allotter and the finding and seizing of calling trunks requires movement of the finder switches in one direction of movement only.

Still another object of this invention is to provide an automatic telephone system having new and improved line finding circuits in which off-normal switch contacts are combined with eleven level contact banks in order to provide trunk call identification to succeeding switches, direct control of all-links-busy and link test marking paths to the allotter, as well as the control of line restricting circuits.

Another object of my invention is to provide a new and improved connector circuit giving restricted service and conversation timing, which enables a busy test challenge to be made before the connector step switch operates to the ringing setting under revertive calling conditions, which provides improved P. B. X trunk hunting and which provides timing from both ends of a switch train.

Still another object of my invention is to provide an automatic telephone system employing a new and improved ring-trip circuit.

It is also an object of my invention to provide a new and improved automatic telephone system in which a selector is prevented from cutting through on dead levels, and a dead level tone is returned to the calling subscriber whenever a dead level is dialed.

Another object of my invention concerns the provision of new and improved means for digit absorbing or cancelling and digit adding.

GENERAL DESCRIPTION

In accordance with my invention, there is provided a system employing step-by-step switches for line finding, each line finder being directly associated with a selector to form a finder-selector link or combination. There is illustrated herein a 1000-line system and there is provided a suitable number of finder-selector links, as twenty, for example. There is provided an allotting circuit for pre-selecting an idle link for the next initiated call. In order to increase the rate of handling calls, the allotter has duplicate relays for all functions, thereby constituting a dual allotter in which each half is normally brought into action by half of the lines, there being, for example, 50 lines assigned to each allotter. Provision is made for transferring all the lines to one-half of the allotter under certain conditions.

After the line finder-selector link has selected the calling line, the selector is caused to hunt, upon the dialing of the first digit of the called number, to select an idle connector in that group of connectors designated by the first digit. After selection of the connector, second and third digits are transmitted to cause the connector step-by-step switch to move to a position corresponding to the called subscriber.

*Line circuit.*—In connection with a system such as that described herein, there is provided a line circuit at the terminating, as well as at the originating, end of each call. The line circuits are arranged to supply ground over a start lead to initiate operation of the allotter; to mark the position of the calling line in the banks of the finder step-by-step switch; to transmit all links busy tone to a subscriber when all of the finder-selector links are in use; to transmit coin box tone to a manual operator when the system is so arranged; to prevent the indefinite holding of a line finder and selector combination when a permanent fault appears by disassociating or locking out the faulty line from the switching equipment after a period of time determined by common timing equipment; and also to eliminate the line, start and marking grounds on terminating calls in order to prevent the unnecessary use of the line finder-selector links.

*Line finder.*—The line finder, as indicated above, is employed to find the calling line. In addition to this primary function, the line finder is used to attach the tip and ring conductors or leads to the calling line; to conduct a busy test to prevent cutting through metallic connections if a connector has seized the calling line during the process of line finding; to cut tip and ring conductors through to the connector on a metallic basis if the busy test is successful; to recycle the allotter if the line finder fails to stop in either direction of motion of the step-by-step switch; to provide trunk call identification to succeeding circuits; and to provide direct control of all links busy and link test marking paths to the allotter. The line finder may be provided with means for discriminating restricted levels in the selector and timed calling levels.

*Allotter.*—The dual allotter, as stated above, serves primarily to control the operation of a pre-selected line finder and to pre-select another idle link upon completion of a line finding operation. The allotter is also used to pre-impulse the selector associated with the idle line finder when the allotter is energized; to drive the line finder in whatever direction is necessary to attach the finder-selector link to the calling line; to drive the line finder in one direction only to attach the link to a calling trunk as distinguished from a calling subscriber's line; to recycle if the line or trunk is not found within a prescribed time; to transfer functions so that one side of the allotter can carry the entire load of the line group in case of trouble or in case all links normally served by the other side become busy; to operate peg count meters; and to return the all links busy tone when required.

*Selector.*—The purpose of the selector circuit, as indicated previously, is to select a group of connectors under the direction of the dial and hunt automatically for an idle trunk in that group. In order to accomplish its purpose, the selector is caused to repeat the dial pulses received from the calling party in order to select the desired group of connectors, to hunt in the selected group for an idle trunk in the level selected by the dial, and then to establish a connection to the succeeding switching equipment. There may also be provided provisions for digit cancelling, digit adding, permanent time release and the transmission of link idle and link busy indications to the allotter.

*Connector.*—The primary functions of the connector are to select a subscriber line and to establish ringing of the desired called station under the control of the calling party. The connector may be of various types depending upon the kind of service which it may be called upon to perform, such as party line ringing of either the harmonic or code type, P. B. X trunk hunting, conversation timing from one or both ends of the system, and revertive calling. Party line ringing may be of any suitable type such as the 2, 4, 5 or 10 party full-selective or 10 or 20 party semi-selective types employing multi-frequencies or combinations of long and short rings to secure the desired party.

P. B. X trunk hunting allows the assignment of successive numbers to a business establishment, or the like, whose telephone needs are sufficiently great to justify the assignment of two or more consecutive telephone lines, in which case, the connector tests the lines in succession until a free line is found. Normally, when the first line is called, testing begins over the entire group. Provision may be made, as for night service, for example, such that if any line other than the first in the group is called, that line only is tested. This feature allows the listing in the telephone directory of all telephone lines, except the first, as night lines for particular individuals whereby at such times they receive the benefit of individual line service.

The conversation timing feature allows for precision timing of telephone calls, either when originated by or completed to subscribers on party lines. Conversation timing may be of any predetermined duration and a warning tone may be given to both parties at predetermined times during the timed interval. Any line may be equipped with time cancelling by means of which calls originated by or completed to any line so equipped have the timing feature rendered inoperative so that conversation may continue uninterrupted for any desired period.

There are illustrated two types of revertive call circuit. One, which may be called special number revertive calling, is designed to allow two subscribers on the same line to call each other by dialing a special number consisting of a preliminary digit followed by a digit corresponding to the calling subscriber's number and a third digit corresponding to the called subscriber's number. As soon as the calling party hangs up after dialing, both subscribers' bells ring. When the call is answered, ringing ceases and the calling party is thereby informed that the call is completed. The second method, known as directory number revertive calling, differs from the foregoing method or type, in that it is not necessary for the calling subscriber to dial a special number. He merely dials the number of the wanted subscriber and hangs up upon receiving the busy tone. After an interval, which he assumes is sufficient to enable the called party to answer, he again removes his receiver and conversation commences if the called party has answered.

In addition to the foregoing functions of the connector, note is made of provisions to determine that the called line is not engaged and to inform the calling party of the existing condition of the called line; to place a distinctive condition on the selected line to prevent seizure by other connectors; to provide current for holding preceding circuits of a switch train operated; to break down automatically an incomplete connection after a predetermined period has elapsed; and to break down automatically a complete connection after a predetermined conversational period has elapsed.

Common equipment is provided to make available the necessary tones, alarms and timing controls when such are common to several circuits.

Figures 2, 3:
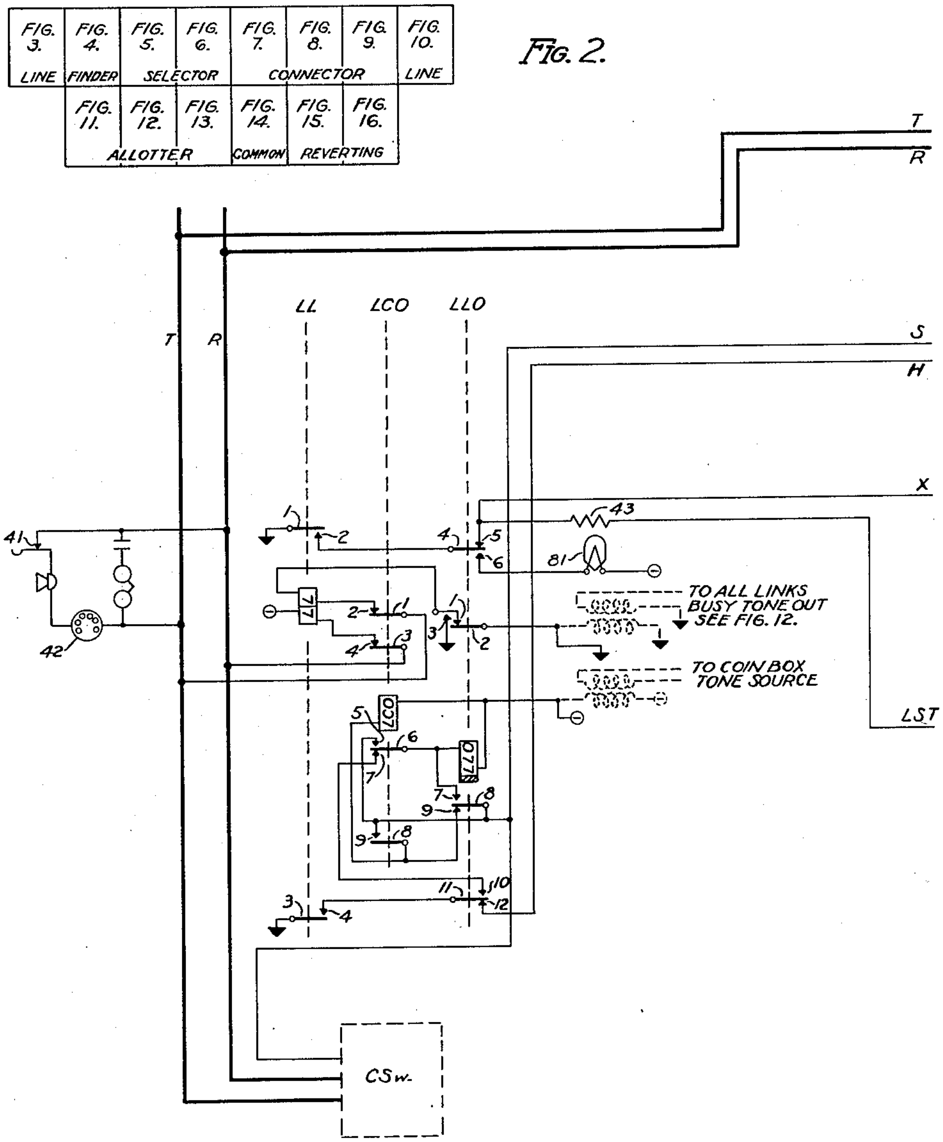
Figure 4:
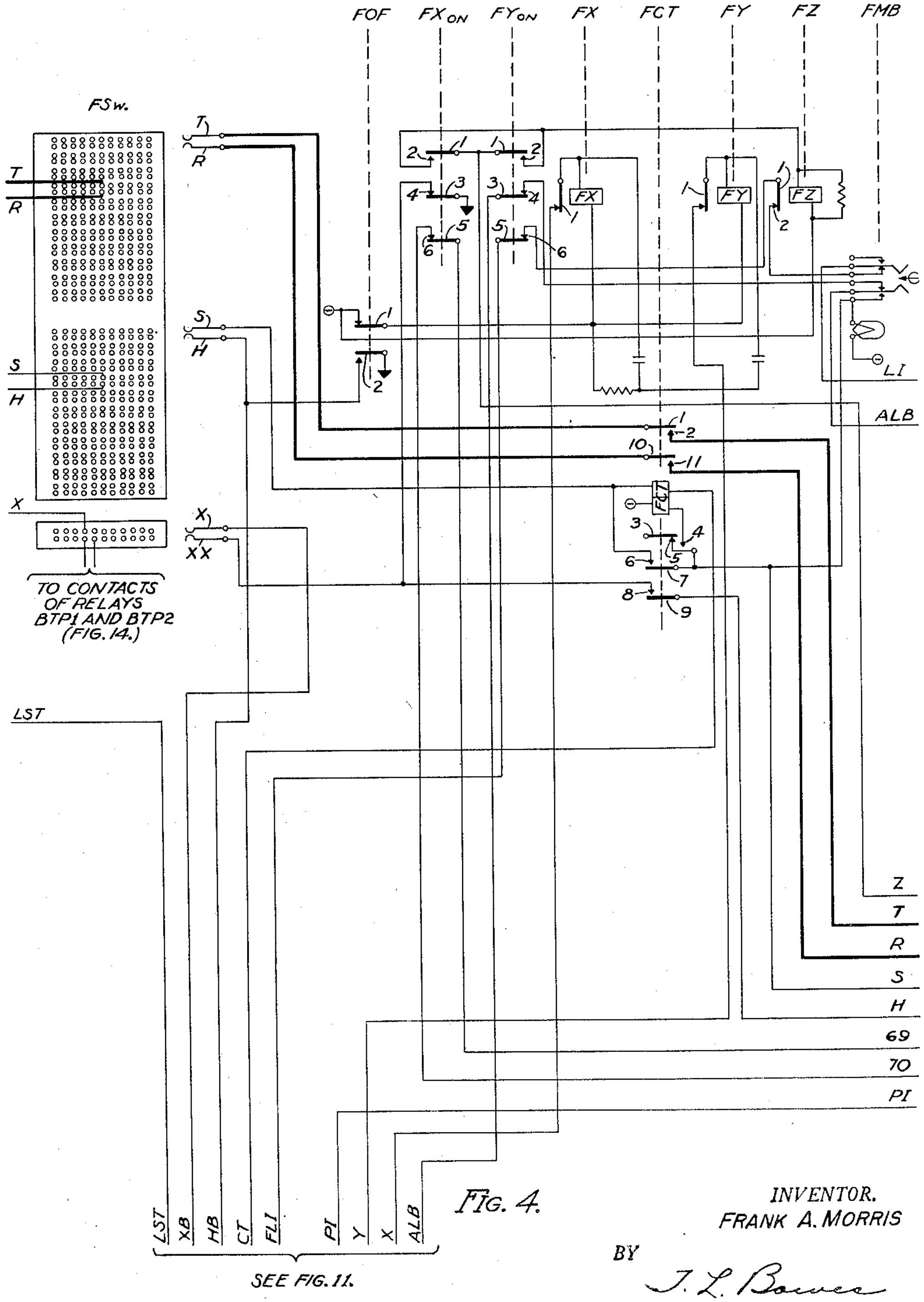
Figure 5:
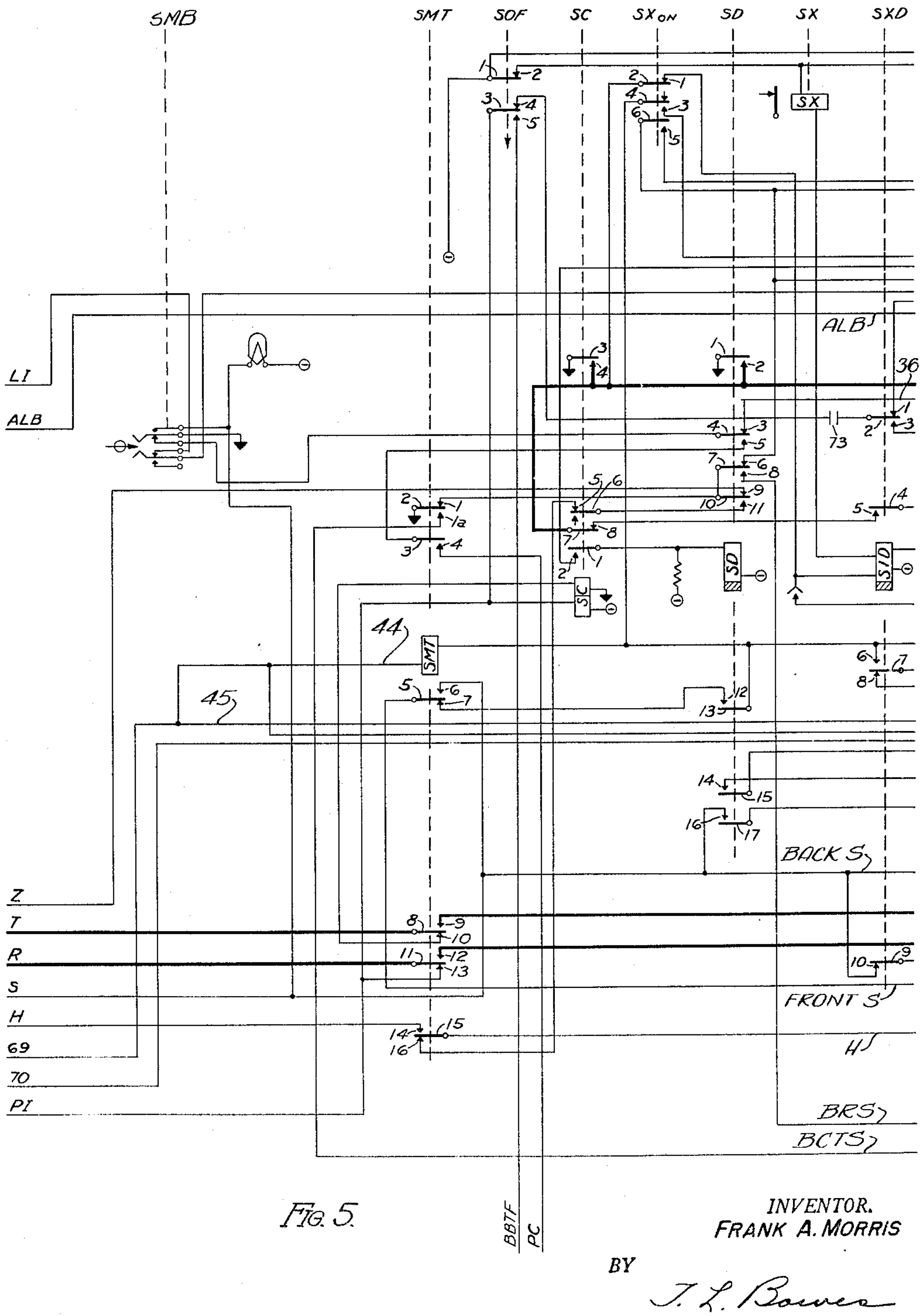
Figure 6:
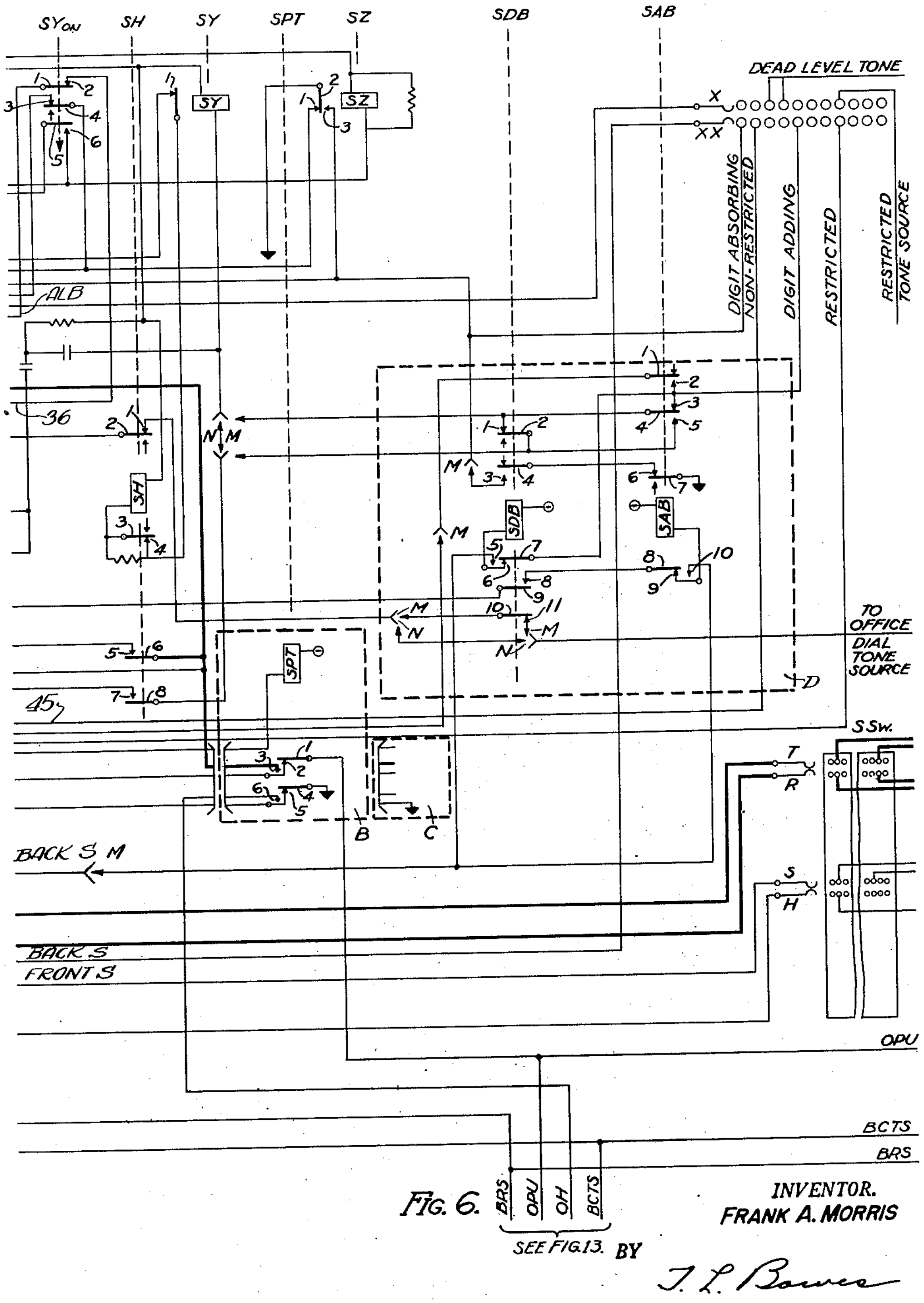
Figure 7:
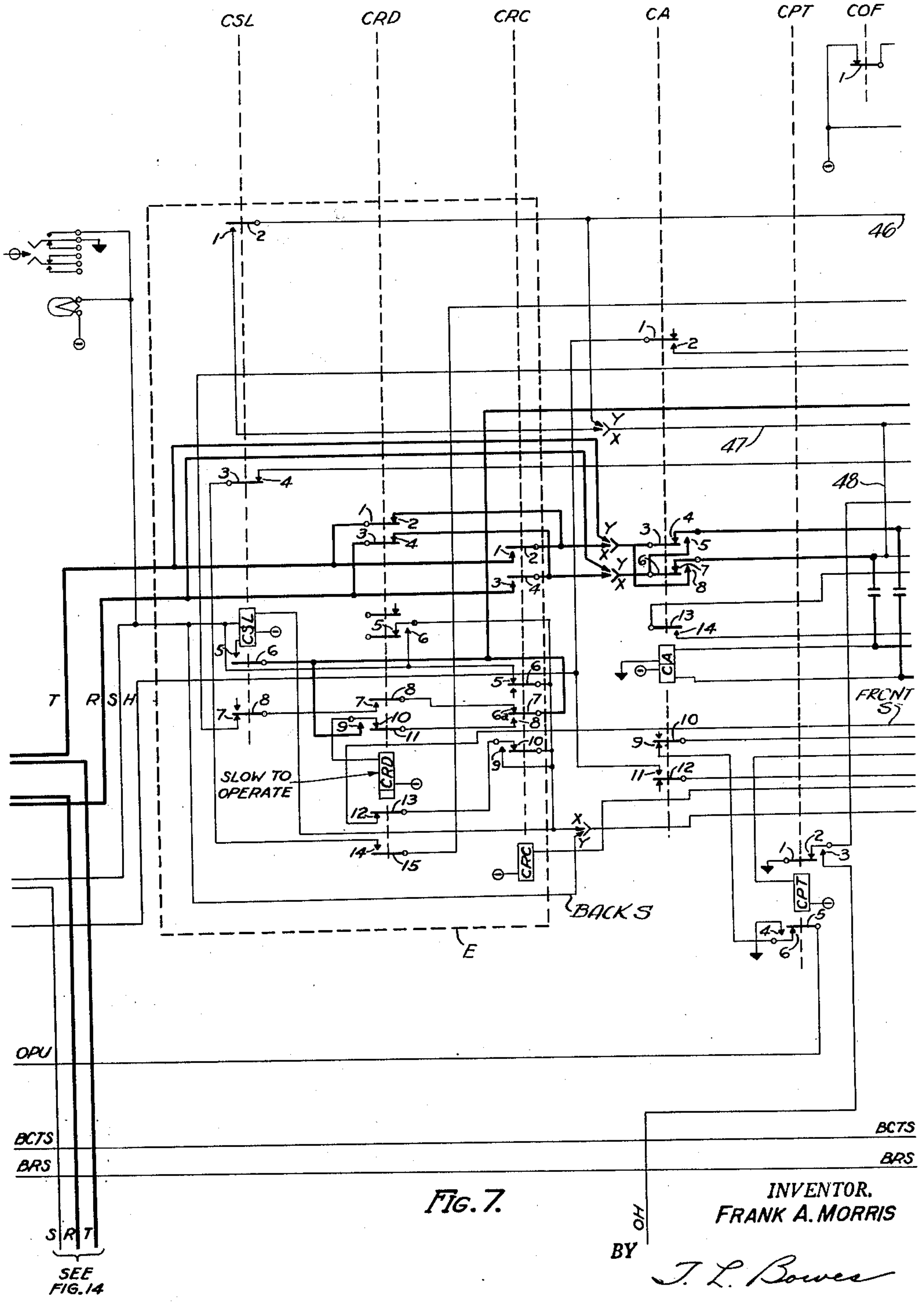
Figure 8:
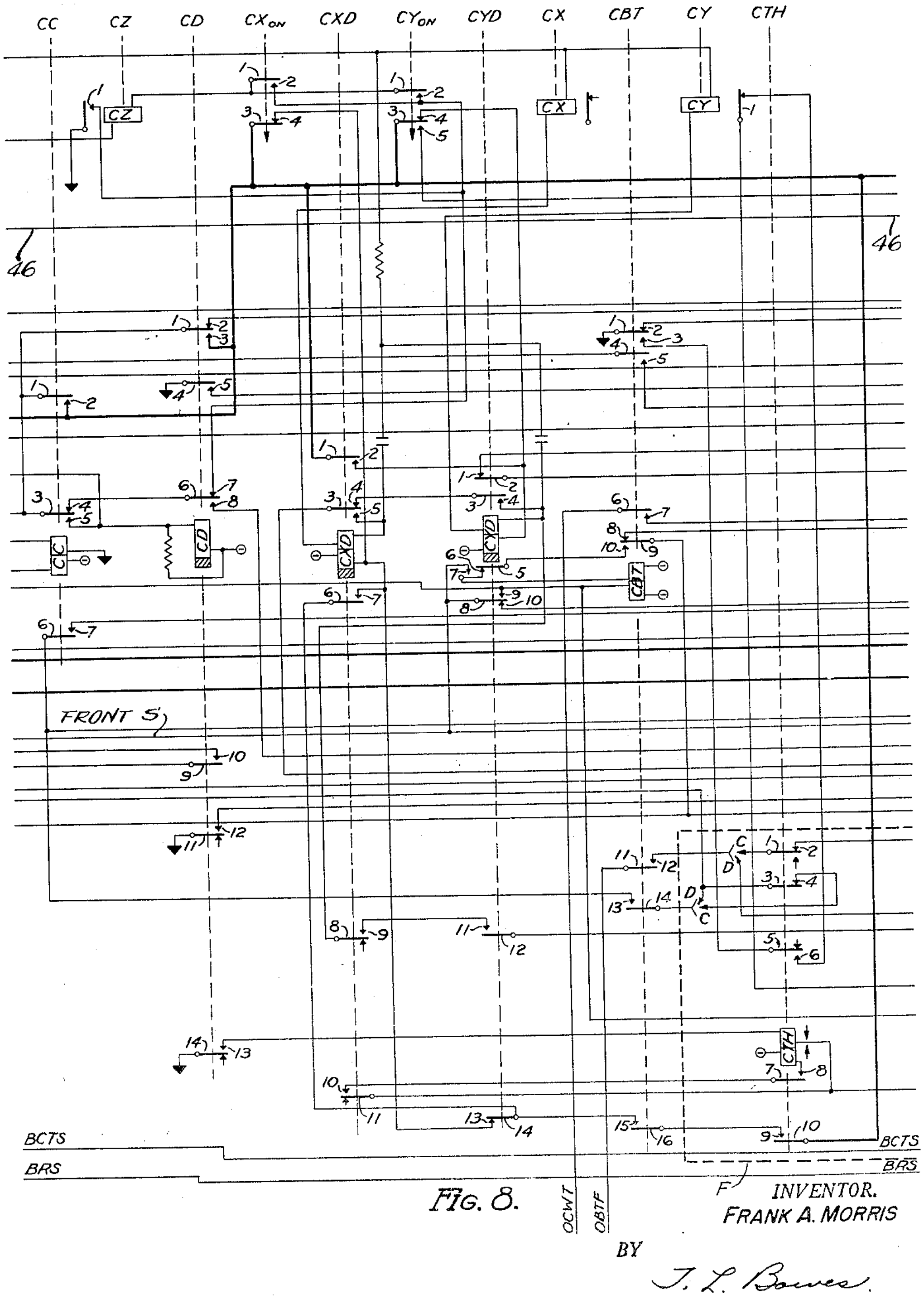
Figure 9:
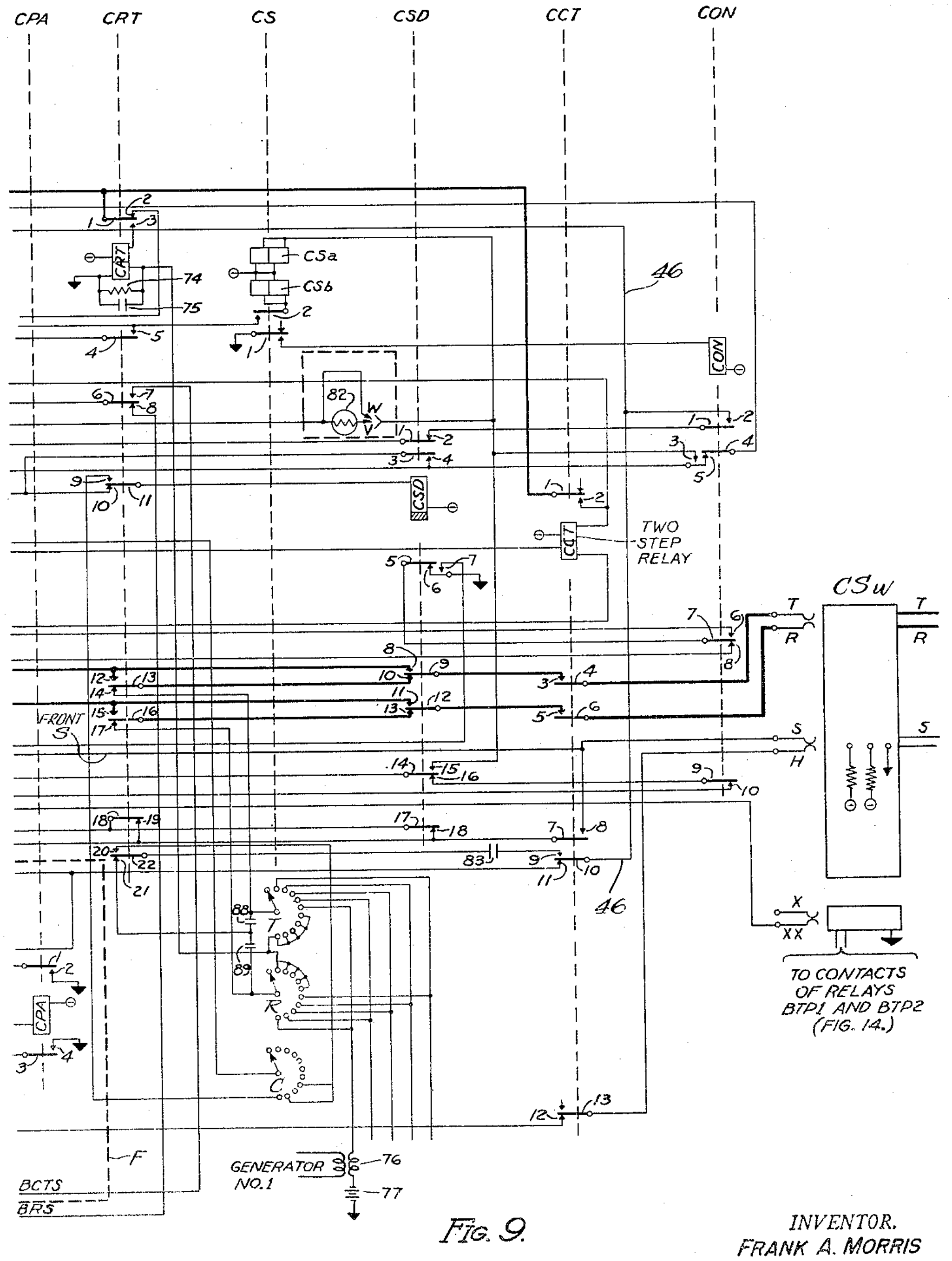
Figure 10:
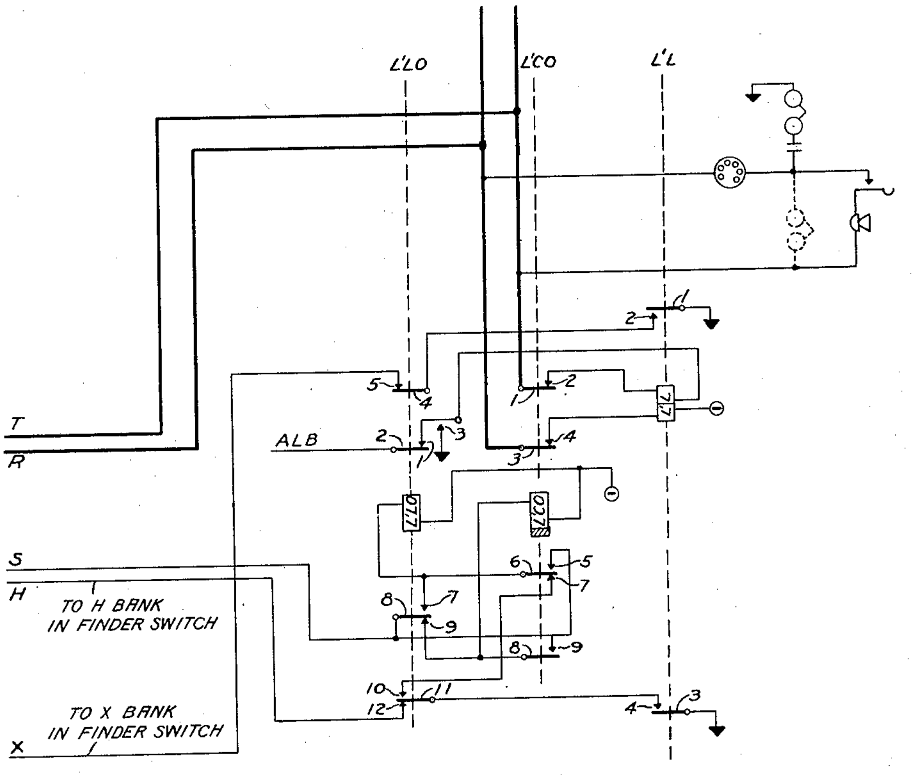
Figure 11:
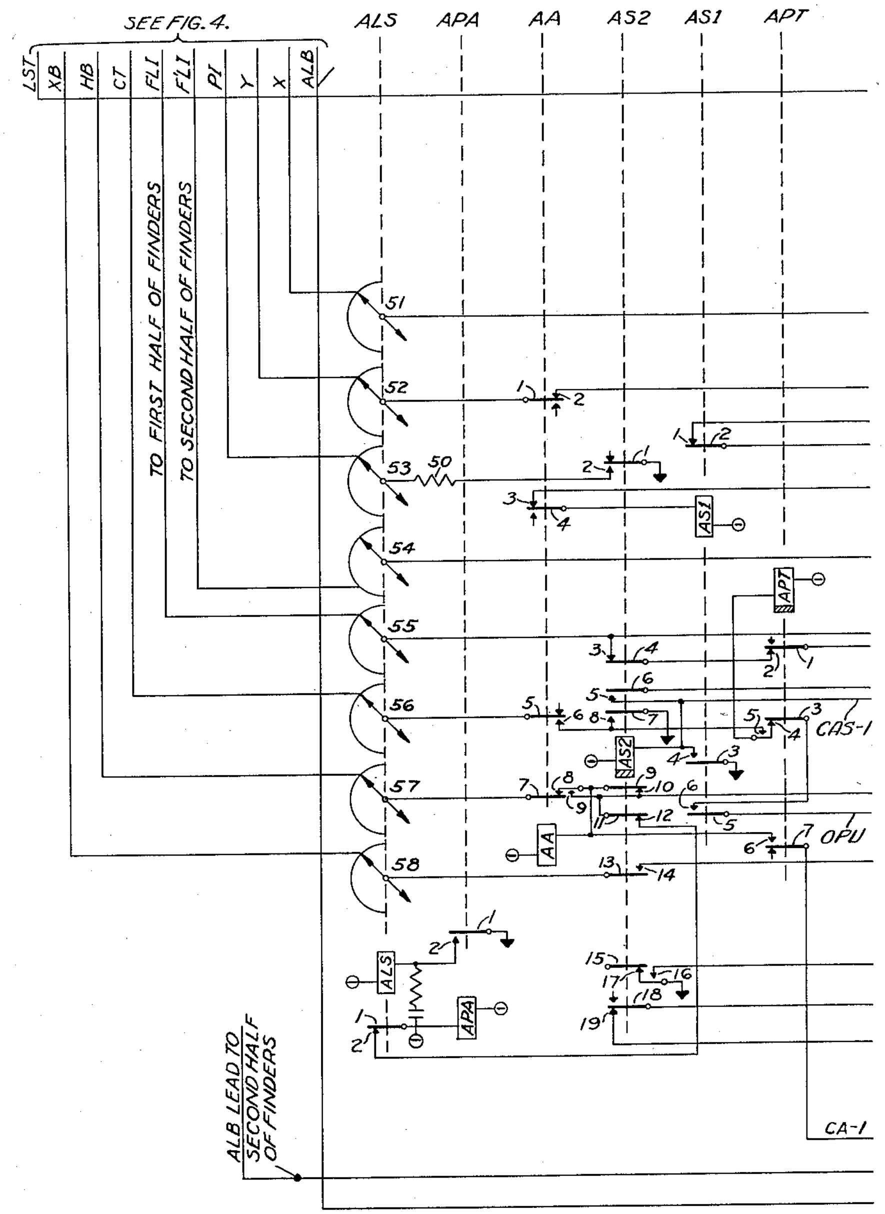
Figure 12:
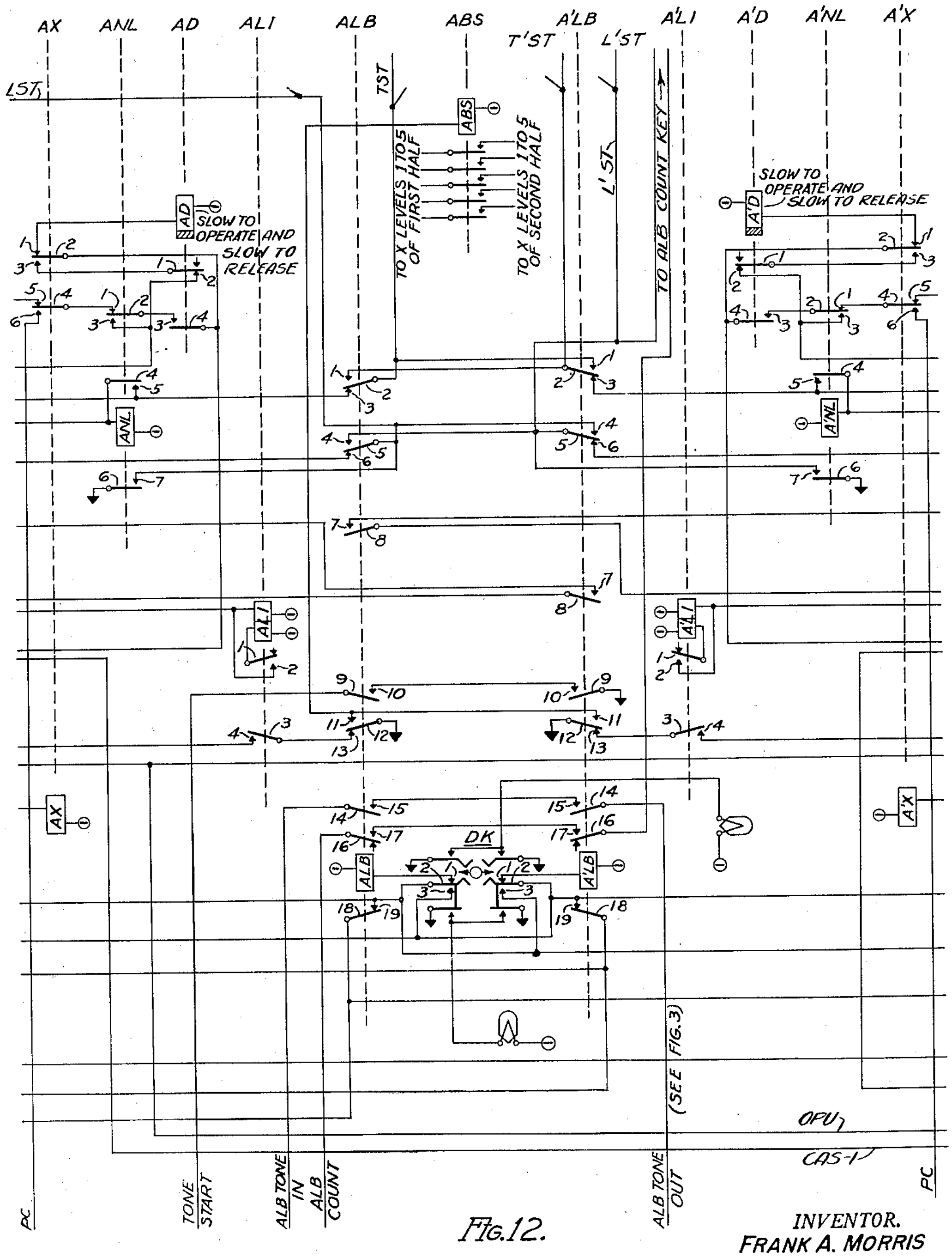
Figure 13:
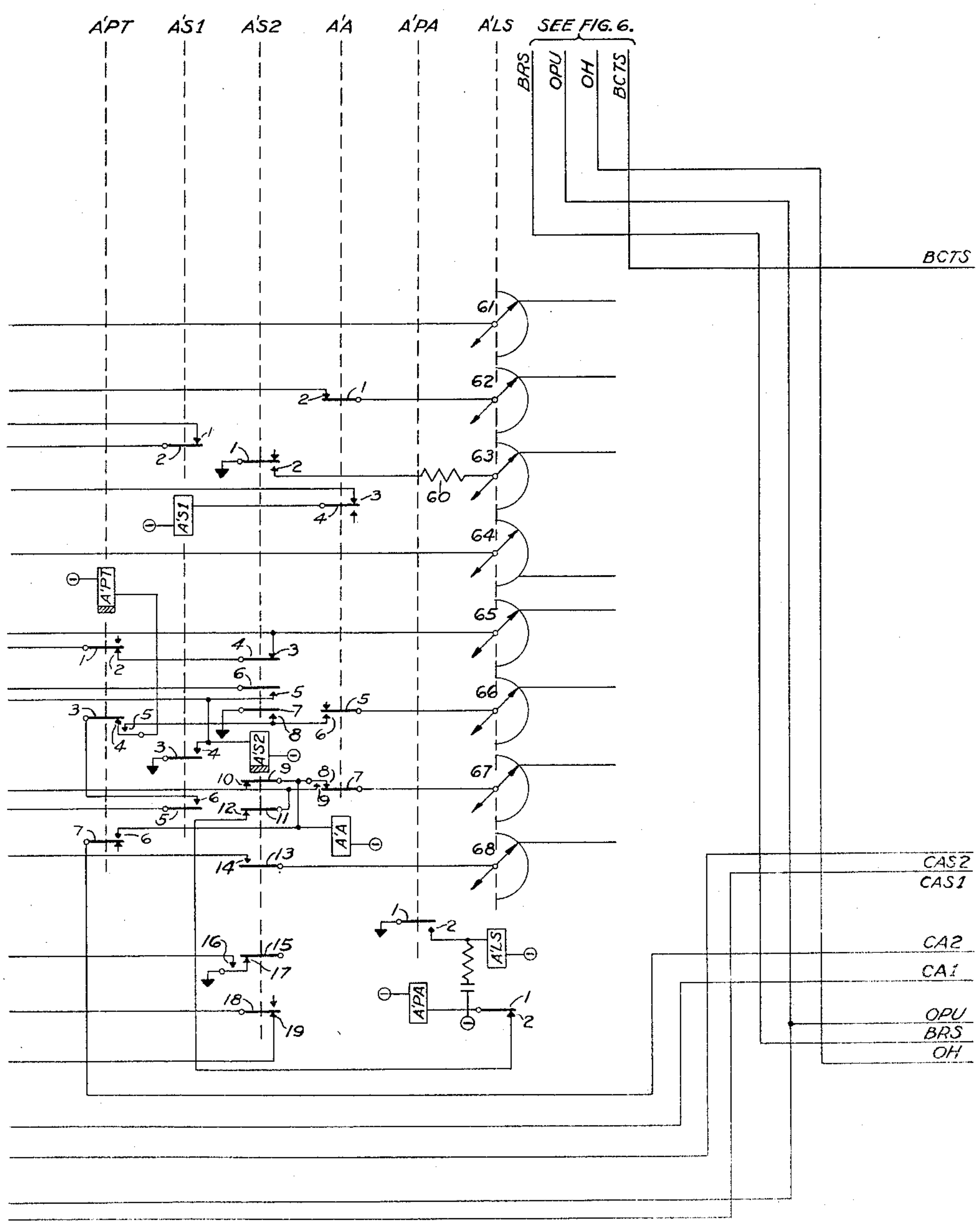
Figure 14:
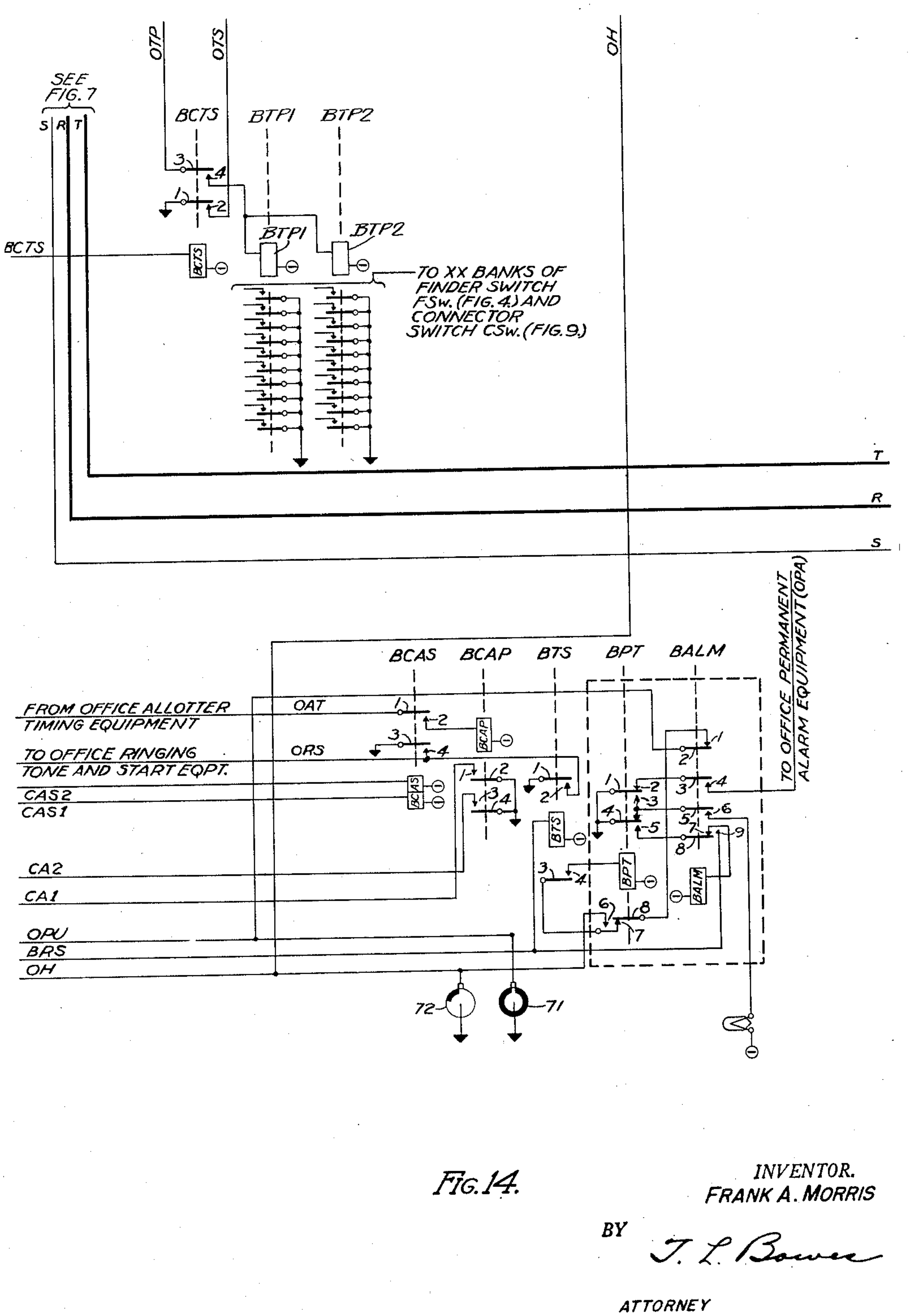
Figure 15:
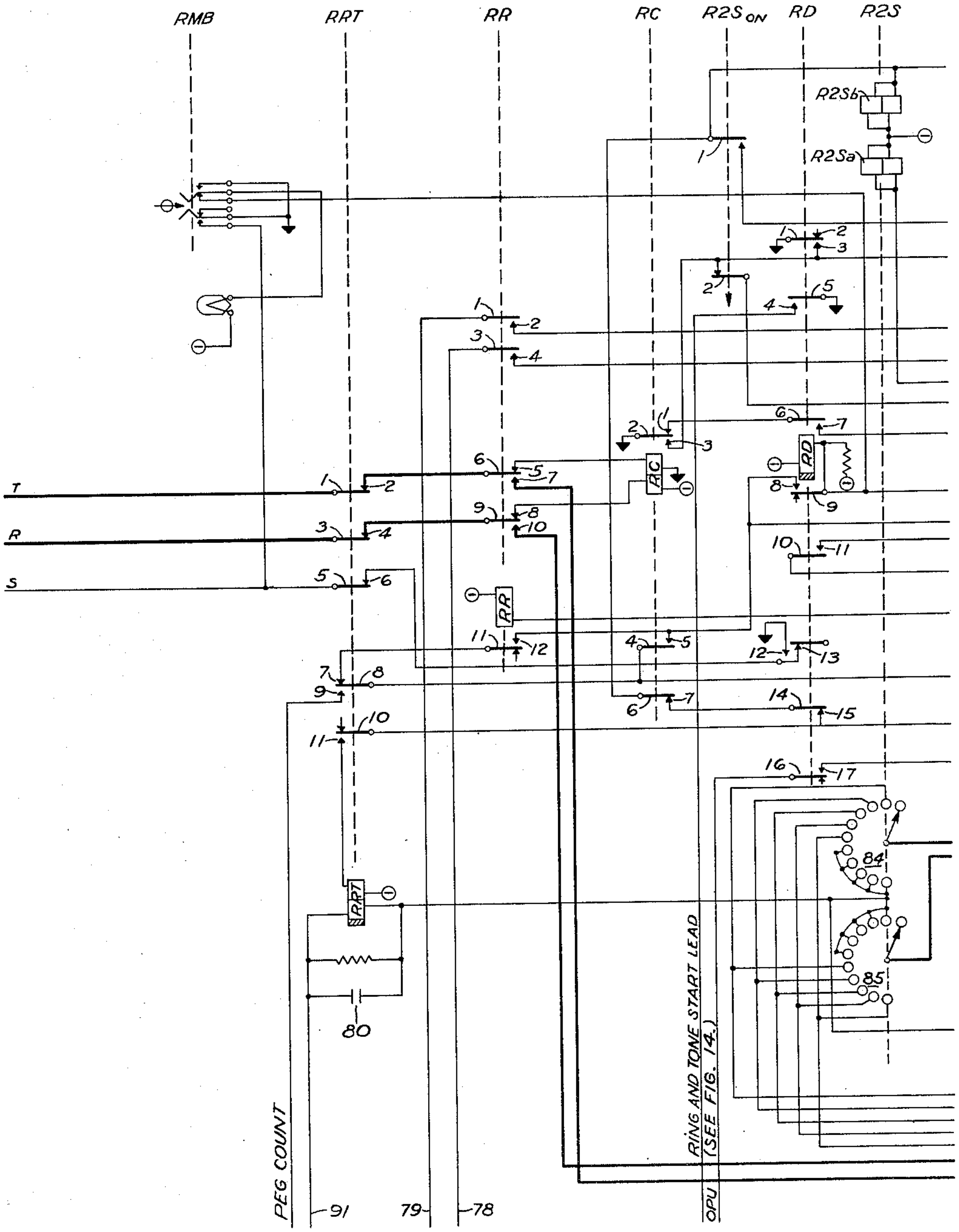
Figure 16:
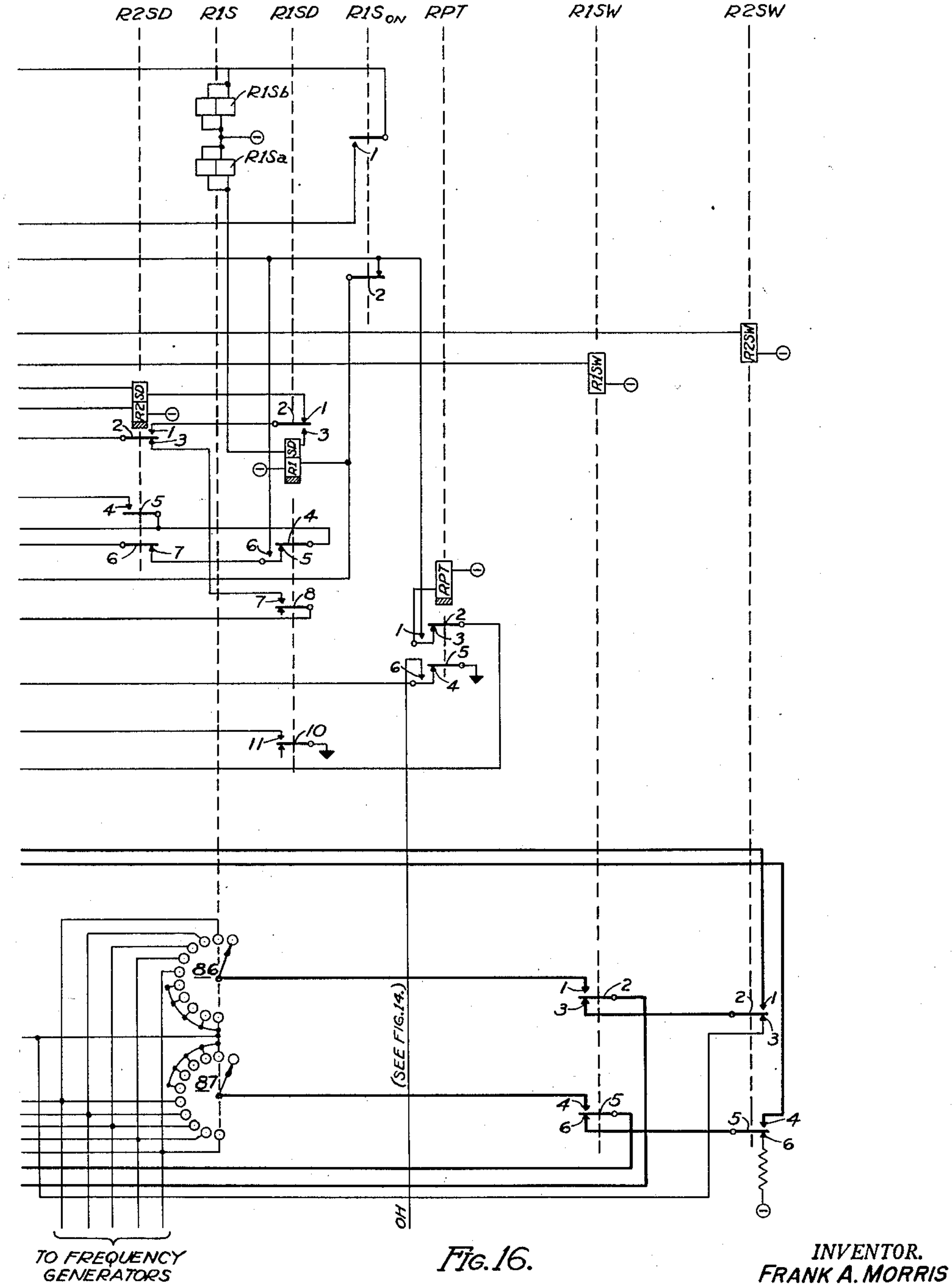
Figures 17, 18:
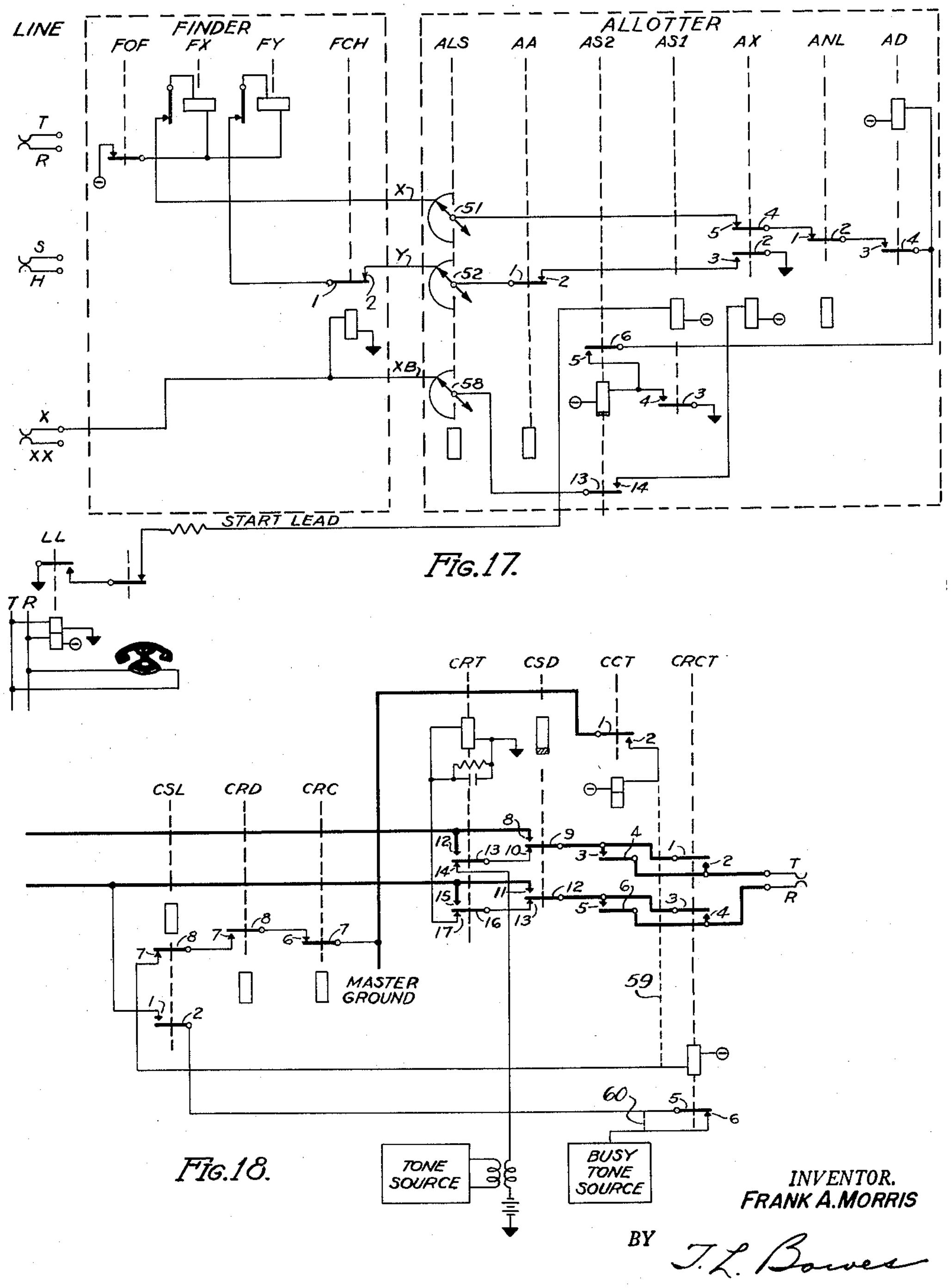

Further objects and advantages as well as a detailed understanding of my invention will be apparent from a study of the following description when read in connection with the drawings in which Fig. 1 illustrates the basic features of a step-by-step switch which may be used to carry out the principles of my invention, Fig. 2 is a chart showing the relationship of the various figures of the drawings and which enables a complete wiring diagram to be assembled if the various figures of the drawings are placed in the indicated locations, Fig. 3 illustrates the line circuit of my system, Fig. 4 depicts the finder switch and associated circuits, Figs. 5 and 6 illustrate the various component parts of a selector embodying the principles of my invention, Figs. 7 and 8 and 9 show a connector circuit illustrating the principles of my invention, Fig. 10 shows a terminating line circuit, Figs. 11, 12 and 13 illustrate a dual allotter for use in the system described herein, Fig. 14 illustrates equipment which is common to the system, Figs. 15 and 16 illustrate an alternative reverting call circuit and Figs. 17 and 18 illustrate modifications of features of the circuits shown in Figs. 4, 11 and 12 and Figs. 7, 8 and 9 respectively.

With respect to Figs. 5 and 6 relating to the selector, it is desired to point out that if permanent timing lock-out is to be employed, the equipment within the dashed rectangle marked with the numeral B is used, but if the lock-out feature is not desired, the ground connection indicated within the dotted rectangle C is substituted. Attention is also called to the dashed rectangle D which is used if digit adding functions are required, in which case wiring "M" is used. If digit adding is not employed, rectangle D is omitted and wiring "N" is substituted.

Referring to the connector, illustrated in Figs. 7, 8, and 9, a number of alternative provisions are made. If directory number revertive calling is employed, the apparatus shown within the dashed rectangle E and "D," "W," and "X" wiring is used, but if the special revertive call circuit illustrated in Figs. 15 and 16 is furnished, the parts shown within rectangle E are omitted and "D," "W" and "Y" wiring is used. If the trunk hunting feature is utilized, the parts shown in rectangle F are included and wiring "C" is used instead of "D." If dual timing is made part of the system, wiring "D" is used, but if this service is not provided, wiring "W" is used. If conversation timing is furnished, wiring "V" is used in place of wiring "W."

*Step-by-step switch*

It is believed that a complete understanding of the principles of my invention requires not only an explanation of a complete telephone system, but also a description of a suitable step-by-step switch. There is illustrated in Fig. 1, a switch specially adapted for use in the system embodying my invention and known by the trade name "XY" switch. This switch derives its name from the fact that the wipers or contact brushes, during movement to a desired position, traverse first in a primary direction and then in the same plane but in a secondary direction at right angles to the first direction, which, in the right-hand rectangular co-ordinate system are X and Y directions, respectively.

There is provided a carriage 1, which makes the primary and secondary stepping movements and has a set of contact brushes comprising two pairs of wipers 2 and 3 mounted on it for tip, ring, sleeve and hunt connections, respectively. These wipers are bifurcated, employing twin contacts that make connection directly onto bare wires which run in banks behind the switches. The bare wires may be arranged in molded frames which may be rigidly mounted to the cells which in turn hold the switches.

The carriage is driven by the cog roller or tubular shaft assembly 4 which slides along the shaft 5 during the X motion. The cog roller 4 is shown in the form of a double-cut tubular gear with ratchet teeth cut parallel to its length and rack teeth cut as rings. The annular rack teeth mesh with and are driven in the X motion by a suitable sprocket or gear 6. For stepping in the X direction, the X magnet 7, located in the upper left corner of the plate 8, operates, through a pawl 9, the ratchet wheel 10 which is suitably mounted on the sprocket assembly. In response to repeated pulses the magnet 7 steps the cog roller assembly 4 along the shaft 5, positioning the wipers on the carriage 1 successively before each wire bank. Since four wipers are involved and each wiper has its own set of 11 wires, 44 rows of wires each 11 deep are lined up along the front edge of the mechanism plate, immediately before the wipers (see Fig. 4). The eleven pairs of wires that are lined up before a pair of wipers constitute a wire bank.

The "XY" switch is nominally a 100 point switch, i. e., is normally given ten steps in the X direction and ten steps in the Y direction, thereby making possible the selection by the wipers, of any one of 100 lines.

To mark the level of X travel, for finder operation, timing or discriminatory purposes, an auxiliary set of contact brushes adapted to be positioned according to the position of the primary movement or set of brushes, and indicated by the numerals 11 and 11a, enters a separate bank comprising X and XX levels. Wipers 11 and 11a are operated by a pinion 12 assembled with the sprocket 6 through a rack 13 to which it is attached. Thus, as the X magnet steps the sprocket 6, both the cog roller 4 and wiper rack 13 move, roller 4 to the right and rack 13 upwardly, as viewed in the drawing. When the X wiper 11 has found the proper level, thereby positioning the wipers on the carriage before the proper wire banks, the X magnet 7 is de-energized and the Y magnet 15 takes over. The Y magnet 15 is located in the lower central portion of the mechanism plate. In stepping, its pawl 16 operates directly on the ratchet teeth of the cog roller 4, turning it, and thus driving the wipers 2 and 3 into the wire banks through the interaction between rack 20 and pinion 21.

The X position of the wipers is shown by reference to a scale 17 attached to the mechanism plate and the Y position by reference to a numbered drum 18 located on the tubular shaft assembly. Thus, the position of the wipers is determined directly and quickly.

It should be recognized that the momentum of the switch, if not arrested, would carry each step beyond its limits. This is more easily realized when one considers that the stepping is of the order of fifty per second. In order to stop the X motion at each step, the end of the armature 35 of the X magnet engages a tooth of the sprocket at the bottom point of the armature travel. The sprocket motion is, therefore, locked each time the X magnet completes a pulse.

In the Y motion, a cam (not shown) on the underside of the Y armature operates against a member 22 called the stop bar. This stop bar is rocked forward at each downward stroke of the Y armature. A knife edge on the stop bar 22 engages a ratchet wheel 23 on the end of the cog roller 4 locking the rotation of the cog roller, and thus the advancement of the wipers, at the completion of each Y armature stroke.

There are provided X off-normal contacts or switches 25, Y off-normal contacts or switches 26, over-flow switches 27 and release springs or switch 28.

The off-normal and overflow switches are mounted as a common assembly located in the lower left-hand corner of the mechanism plate and the release springs are mounted on a separate assembly located near the release magnet 30.

The X and Y off-normal springs 25 and 26, respectively, perform similar functions, that of informing the relay equipment associated with each switch as to the position of the brushes or wipers. Operation of the X off-normals, for instance, indicates that the switch has taken at least a single step in the X direction. Operation of the Y off-normals similarly indicates that at least a single step has been taken in the Y direction.

The circuit function of the off-normals differs in each use of the switch but, in general, indicates that it has either moved in one direction and should now move in another or all necessary motion has taken place. There is, however, one circuit function common to all switches and that is to remove current from the release magnet 30 when the brushes have returned to the normal position. When the release signal is given, current is kept on the release magnet 30 until the switch is fully home and is then removed to avoid unnecessary current flow and heating. Both the X and Y off-normals are used in this function since the switch can be moved independently in either direction.

In the event of certain incorrect manipulations or an all-trunks-busy condition, hunting switches may progress the entire length of the bank without encountering a stopping signal. Unless some means of correction were provided, they would continue to hunt vainly until the circuit was deenergized. Overflow springs 27, arranged to operate in the extreme position of the brushes in either the X or Y directions (namely the eleventh X or Y step), interrupt the magnet current in order instantly and permanently to stop useless stepping until the switch is released.

The release springs 28 have two important functions in connection with the release of the switch. First, it is necessary to continue the release signal until the switch is fully home despite any re-energization of the circuit which might occur. Second, there must be positive protection against premature seizure of a switch before it is fully home. In the "XY" switch, the first is accomplished by a release spring contact establishing a self-locking electrical circuit which keeps the driving pawls 9 and 16 removed from the ratchet wheel (X motion) and the cog roller (Y motion). The lock is interrupted when the switch returns home. The second function is performed by a second release spring which maintains a busy indication until the switch is home, thus preventing its seizure until everything is normal. When the release magnet 30 is energized, stop members 31 and 32 are removed from engagement with cog roller 4 and sprocket 10, respectively, through operation of armature 33. The Y return movement of the carriage is then performed by a spring 34 coiled in the tubular shaft of the cog roller and the X movement by a spring (not shown) coiled around the shaft of the sprocket 6.

DETAILED CIRCUIT DESCRIPTION

In the following detailed description, a call is traced from the calling party's station to the called party's station. Revertive calling is then discussed and finally circuit refinements to provide special features and to take account of special conditions are described.

The telephone system herein described in detail comprises a single selector and, therefore, serves a 1000-line system and requires the transmission of four digits, one to select the desired group of connectors, the second to determine the tens digit of the called number, the third to select the units digit of the called number, and the fourth to ring the called line. The principles of my invention, of course, are not limited to the particular choice of circuits described herein as a system and my invention is equally aplicable to any desired combination of the various circuit components.

In describing the circuits involved, the various relays are designated by letter combinations. The first letter indicates the part of the system in which the relay is located, i. e., L indicates line circuit, F indicates finder, A indicates allotter, S indicates selector, C indicates connector, R indicates a special reverting call circuit and B refers to common equipment. Following the initial letter are one or more letters which are usually the initials of the name of the relay with which they are associated and which serve to identify that relay. For example, C refers to a calling relay, PT to a permanent timing relay, D to delay, and X and Y to switch motion. Thus, SXD refers to a slow release (delay) relay associated with the X motion of the selector switch. The relay contacts and armatures are identified by the same letters referred to above followed by a hyphen and then a numeral. Thus, SXD-2 designates an armature of the SXD relay.

It may be noted that in the described system, when the battery is connected into the system but no calls are being made, the ALB and ALI relays are energized but all other relays are de-energized. The ALB and ALI relays remain energized as long as there is an idle link (a link comprising a finder and a selector). The other relays are energized at various times during the progress of a call. Hence, in the drawings, the armatures of the ALB and ALI relays are shown in the operated positions while the armatures of the rest of the relays are shown unoperated. The term "battery" when used in the following circuit description refers to the negative side of battery. The positive side of battery is grounded and hence the term "ground" refers to positive battery.

*Line circuit*

Referring to Figure 3 of the drawings, a call is initiated by removing the receiver from the hookswitch or cradle, thereby closing the hookswitch contacts 41 as shown in Fig. 3 and completing a circuit through a suitable dialing mechanism 42 to the tip and ring leads, T and R, respectively. Closure of the hookswitch completes a circuit for the energization of line relay LL. Relay LL is a two-winding relay. One terminal of the lower winding is connected to battery and the other terminal is connected to the ring lead R through contact LCO—4 and armature LCO—3. The circuit to ground from the tip lead T comprises armature LCO—1, contact LCO—2, the other coil of relay LL, contact LLO—1 and armature LLO—2 to ground. If all-links-busy tone is to be provided, the foregoing circuit is grounded through a transformer as indicated in dashed lines in Fig. 3 instead of directly as shown by the solid line.

Operation of line relay LL grounds a start lead LST to the dual allotter in order to cause a pre-selected finder to hunt for the calling line, grounds the X-mark lead to mark the tens position of the calling line in the banks of the line finder switch FS*w* (Fig. 4) and also grounds the H lead to mark the units position of the calling line in the banks of the line finder FS*w*.

The X-mark circuit is as follows: ground at armature LL—1, contact LL—2 of line relay LL, armature LLO—4, and contact LLO—5 of lockout relay LLO to the contact in the X bank of the line finder switch FS*w* corresponding to the calling line. The hunt lead H is grounded as follows: ground at armature LL—3, contact LL—4, armature LLO—11, and contact LLO—12, to the contact in the hunt bank of the line finder corresponding to the calling line.

Ground on the start lead is utilized to operate a start relay in the allotter (Figs. 11, 12 and 13) which initiates the energization of the line finder switch (Fig. 4) chosen by the allotter to serve the call. The start lead is traced over the following circuit: ground at armature LL—1, contact LL—2, armature LLO—4, contact LLO—5, resistor 43, and start lead LST, to the allotter.

When the calling line is found, as will be more fully described hereinafter, ground is placed on the sleeve lead S in the sleeve bank of the finder switch FS*w* (Fig. 4) and conducted to the line circuit by lead S. Presence of ground on the sleeve lead S operates the cut-off relay LCO over a circuit extending from grounded sleeve lead S, armature LLO—8, contact LLO—9, winding of cut-off relay LCO to battery. If provision is made for the transmission of coin box tone to an operator, the cut-off relay LCO is connected to battery through a transformer winding as indicated in dotted lines in Fig. 3 instead of directly as shown by the solid line. Cut-off relay LCO locks up through a circuit extending from grounded sleeve lead S, through contact LCO—9, armature LCO—8, and winding of relay LCO to battery. Operation of the cut-off relay is now independent of subsequent operation of lock-out relay LLO.

When the cut-off relay LCO is energized, the tip and ring leads, T and R, respectively, are disconnected from the line relay LL by the opening of the line circuit at contacts LCO—2 and LCO—4. De-energization of relay LL removes ground from the marking leads at contacts LL—2 and LL—4 respectively.

The energization of cut-off relay LCO also causes ground to be placed on the winding of lock-out relay LLO, the circuit extending from the grounded sleeve lead S through contact LCO—5 and armature LCO—6 to one terminal of the winding of relay LLO. The other terminal of the LLO coil is connected to battery. Operation of the lock-out relay LLO breaks the original energization path to the cut-off relay LCO at contact LLO—9 but the cut-off relay LCO remains locked up as explained above. Lock-out relay LLO locks up to the grounded sleeve lead S through its own armature LLO—8 and contact LLO—7 and hence is independent of any subsequent action of cut-off relay LCO.

*Allotter and line finder*

In the "at rest" condition of the allotter, i. e., circuits connected but no calls being made, the allotter is cut through to an idle link comprising an interconnected finder and selector by means of contacts and brushes of the rotary link selector switch ALS. The link busy relays ALB and A'LB associated with left and right hand portions, respectively, of the allotter and the link idle relays ALI and A'LI are normally picked up by grounds derived through chains of contacts in the line finder and the selector. Thus, referring to relay ALB (see Fig. 12), one side of its winding or coil is connected to battery. The other side of the coil ALB is connected to ground over a circuit extending through contact DK—1 and arm DK—2 of the disable key DK, armature A'S2—18 and contact A'S2—19 of start relay A'S2, ALB lead to the finder (Fig. 4), armature FY*on*—3 and contact FY*on*—4 of the finder Y off-normal switch FY*on*, contacts of the make busy switch FMB, ALB lead from the finder to the selector (see Figs. 5 and 6), armature SY*on*—1 and contact SY*on*—2 of the selector Y off-normal switch SY*on*, conductor 36, contact SD—3 and armature SD—4 of selector delay relay SD, and contacts of the selector make busy switch SMB to ground. Inasmuch as all finder-selector links are multipled, if any link is not operated or employed, relay ALB is energized through at least one closed off-normal contact in the finder and the selector.

The operating circuit for link idle relay ALI is as follows: battery, upper winding of ALI, armature APT—1 and contact APT—2 of the permanent timing relay APT, armature AS2—4, contact AS2—3, arm and contact of rotary switch element 55 of link selector switch ALS, link idle lead FLI to the line finder (Fig. 4), spring or armature FY*on*—5 and contact FY*on*—6 of the finder Y off-normal switch FY*on*, armature FZ—1 and contact FZ—2 of release magnet FZ, armature and contact of make busy switch FMB, link idle lead LI to the selector, contacts of the selector make busy switch SMB, contact SY*on*—3, spring or armature SY*on*—4 of the selector Y off-normal switch SY*on*, contact SZ—1 and armature SZ—2 of release magnet SZ to ground. In order to make link idle relay ALI pick up as rapidly as possible and insure halting of allotter cycling upon reaching an idle link, a second or lower winding is provided for relay ALI which is connected in parallel with the upper winding through armature ALI—1 and contact ALI—2. When the relay ALI picks up, the parallel circuit is broken at contact ALI—2.

The all links busy relay A'LB and link idle relay A'LI for the right-hand half of the dual allotter are similarly connected.

Since a finder and a selector are permanently connected together, one set of off-normal contacts can be omitted in both all links busy and link idle circuits as well as one release or Z contact from the link idle circuit. However, provision of all the foregoing contacts is preferable in order to insure high quality of service by avoiding trouble in case either a finder or a selector becomes inoperative or ineffective for any reason.

At this stage of operation, the allotter-selector switch ALS stands at a position corresponding to an idle link and the ALB relay is energized. In other words, a pre-selected link is prepared for the receipt of a call. As previously stated in describing the line circuit, the line circuit grounds the line start lead LST through a resistance 43 and imposes solid ground on X and H terminals in the X and H banks of the line finder. Resistance ground is thus brought in from the line circuit over the line start lead LST to complete a circuit for start relay AS1 through armature ALB—5, contact ALB—6, contact AA—3 and armature AA—4 to the winding of start relay AS1, the other side of the relay winding being connected to battery. The start relay AS1 is energized over the foregoing circuit and closure of its armature AS1—3 and contact AS1—4 completes an obvious circuit for energizing start relay AS2.

As a result of the energization of relay AS2, the pre-impulse lead PI is grounded to operate the selector calling relay SC. The circuit for relay SC extends from ground in the allotter through armature AS2—1, contact AS2—2, resistor 50, brush and contact of section 53 of selector switch ALS, the PI lead to the selector (Figs. 4 and 5), and the lower winding of relay SC to battery. Operation of relay SC causes energization of the selector delay relay SD over a circuit extending from the winding of relay SD through armature SC—1, contact SC—2, contact SZ—1 and armature SZ—2 of the selector release magnet SZ to ground, the other terminal of winding SD being connected to battery. Operation of relay SD removes ground from the release lead Z extending between the finder and the selector at contact SD—9.

Referring to the allotter start relay AS2, it is noted that in order to permit the link selector switch ALS to select the next idle link as soon as possible, since the selector switch ALS can step only when the link idle relay ALI is deenergized, as will be more fully explained later, the energization of relay AS2 opens the ground circuit over the FLI lead, allowing the link idle relay ALI to release. The picking up of relay AS2 also completes a circuit for energizing the allotter delay relay AD, which is slow to operate, as indicated, in order to permit pre-impulsing, i. e., the energization of the selector calling relay corresponding to the next idle link, as well as slow to release. This circuit extends from battery through the winding of relay AD, contact AX—1 and armature AX—2 of the allotter X-stopping relay AX, armature AS2—6, contact AS2—5, contact AS1—4 and armature AS1—3 to ground.

Operation of relay AD places ground on the stepping magnet FX in the finder (Fig. 4) through a circuit extending from ground at armature AS1—3, through contact AS1—4, contact AS2—5, armature AS2—6, armature AD—4, contact AD—3, armature ANL—2 and contact ANL—1 of the allotter normal level relay ANL, armature AX—4, contact AX—5, brush and contact of section 51 of switch ALS, the X lead to the finder, and interrupter switch FX—1 of magnet FX to the magnet winding of FX. The other terminal of the winding of magnet FX is connected to battery through the finder overflow switch FOF—1. The finder X magnet FX drives the finder switch FS*w* in the X direction on a self-interrupting basis because energization of FX breaks the driving circuit at interrupter switch FX—1. The resulting de-energization of the magnet releases the armature and re-closes the driving circuit. Thus, each impulse causes the switch to move forward one step.

The X brush of the finder switch FS*w* eventually engages the X terminal or contact marked with ground by the line circuit, thereby completing a circuit to energize the X-stopping relay AX. One side of the coil of relay AX is connected to battery. The other terminal of the winding of the AX relay extends to the above-mentioned ground through contact AS2—14, armature AS2—13, brush and contact of section 58 of ALS, the XB lead to the finder, the X brush, and the tens-mark or X-mark lead in the line circuit. The winding of relay AX preferably has a low resistance, for example approximately 140 ohms, in order to permit a relatively large number of ampere turns and a relatively low inductance so that prompt action of the relay is obtained to insure stopping the finder switch at the proper point and avoid overshoot. Operation of relay AX removes the driving ground from the X lead, so that magnet FX remains de-energized and no further attempt is made to drive the finder switch FSw in the X direction. The operation of relay AX also allows the release of relay AD by opening its energizing path at contact AX—1.

The release of relay AD initiates operation of the finder switch FSw on a self-interrupting basis in the Y direction to seek the units position of the calling subscriber. The driving circuit extends from the upper side of driving magnet FY through the FY interrupter switch FY—1, the Y lead to the allotter, contact and brush of section 52 of selector switch ALS, armature AA—1 and contact AA—2 of allotter advance relay AA, contact AD—2, armature AD—1, contact AX—3, armature AX—2, armature AS2—6, contact AS2—5, contact AS1—4 and armature AS1—3 to ground. The other side of the stepping magnet FY is connected to battery through overflow switch FOF—1.

When the H brush of the finder switch contacts the H terminal or contact in the hunt bank of the finder switch which is marked with ground by the line circuit, the allotter advance relay AA is energized. One terminal of the winding of relay AA is connected to battery. The circuit to ground for the other terminal of the winding includes contact AA—8, armature AA—7, brush and contact of section 57 of selector switch ALS, the HB lead to the finder, hunt brush H of the finder switch FSw, the contact in the hunt bank representing the calling line, contact LLO—12, armature LLO—11, contact LL—4 and armature LL—3. Relay AA locks to ground through contacts AA—8 and AA—9, contact ALI—4, armature ALI—3, contact ALB—13 and armature ALB—12 to ground.

The operation of the allotter advance relay AA performs several functions. Motion of the selector switch FSw in the Y direction is halted by the opening of the driving circuit at armature AA—1. The line start lead LST is also opened at contact AA—3, which results in the de-energization of start relays AS1 and AS2. At this point attention is called to the necessity of opening the start lead before accepting the next call, even though a call may be awaiting service, because relay AS1 would otherwise remain operated and disable the system until all calling parties hang up.

The operation of the allotter advance relay AA also establishes a circuit for cutting through the calling line to the tip and ring conductors, T and R, respectively, of the selector. This is accomplished by grounding the cut-through lead CT as follows: ground at armature AS2—7, contact AS2—8 (relay AS2 is slow to release so that at this stage its make contacts are still closed even though the energizing circuit of relay AS2 has been opened), contact AA—6, armature AA—5, brush and contact of section 56 of selector switch ALS, CT lead to the finder, upper winding of finder cut-through relay FCT, sleeve brush S of switch FSw, contact or terminal in the sleeve bank of finder switch FSw, the sleeve lead S to the line circuit, armature LLO—8, contact LLO—9, winding of cut-off relay LCO to battery. The line cut-off relay LCO and finder cut-through relay FCT are thus operated in series. Operation of relay FCT grounds the sleeve lead S between the finder and the selector as follows: S brush at the finder switch FSw, contact FCT—6, armature FCT—7, forward or front sleeve lead S to the selector, contact SD—16, armature SD—17, contact SPT—5 and armature SPT—4 of the selector permanent timing relay SPT to ground. Ground on the sleeve lead S lights the busy lamp located at the selector make busy switch SMB.

Relay FCT locks to the grounded S lead from the pre-impulsed selector over the above-described circuit and continues the grounded connection to the line circuit sleeve lead. The locking circuit extends from front sleeve lead S through contact FCT—5, contact FCT—4, and the lower winding of relay FCT to battery. As described above, ground on the selector or front sleeve lead was extended back to the line circuit through armature FCT—7 and contact FCT—6 to energize line cut-off relay LCO. Operation of the relay LCO de-energizes line relay LL to remove ground from the start lead LST and the X-mark and hunt-mark leads. The line circuit sleeve lead ground holds up the cut-off and lock-out relays.

Energization of cut through relay FCT cuts through the T and R leads on a metallic basis to the pre-impulsed selector at armatures FCT—1 and FCT—10, respectively, at contacts FCT—2 and FCT—11, respectively. The XX brush of the finder switch FSw is cut through to the selector hunt lead H by the closure of armature FCT—9 and contact FCT—8 to effect restriction or timing discrimination, if provided.

It was previously stated that operation of relay AA effects the release of relay AS2. The de-energization of relay AS2 prepares a circuit for the energization of the allotter pulse assist relay APA which works in conjunction with link selector switch ALS on a pulse-help basis to cause selector switch ALS to step to the next idle link. One side of the winding of relay APA is connected to battery. The other side of the winding reaches ground through the interrupter contacts of switch ALS, contact AS2—12, armature AS2—11, contact AA—9, contact AA—8, armature AS2—9, contact AS2—10, contact ALI—4, armature ALI—3, contact ALB—13 and armature ALB—12. The driving circuit for the selector switch stepping magnet ALS is obvious. Switch ALS continues to step until ground is found on the LI and FLI leads, a condition which causes energization of relay ALI and opening of the driving circuit for relay APA at armature ALI—3. Lead LI is grounded when the selector release magnet SZ and the finder release magnet FZ are deenergized, the selector and finder Y off-normal contacts are closed, and the finder and selector make busy switch contacts are closed. If a finder or selector switch is off normal or any switch or circuit plate is unplugged, relay ALI releases to advance the allotter to the next step. Operation of relay ALI also allows the allotter advance relay AA to release by opening the circuit for the winding of relay AA at contact ALI—4. Deenergization of relay AA prepares the start lead circuit for start relay AS1 if another line is demanding attention.

*Selector*

The following description of the selector circuits assumes that a pre-impulse ground has been placed on the lower winding of the selector calling relay SC as described heretofore, and that the tip, ring, sleeve and hunt leads T, R, S, and H, respectively, are cut through to the selector as previously described. Energization of relay SC establishes master ground through armature SC—3 and contact SC—4. Master ground as used herein, means a ground available only when the circuit is energized, i. e., a switched ground.

Operation of the SC relay effects energization of the selector delay relay SD over a circuit extending from the winding of the SD relay through armature SC—1, contact SC—2, contact SZ—1, and armature SZ—2 to ground, the other side of the winding of relay SD being connected to battery. Operation of relay SD accomplishes a number of results; master ground is established by the engagement of contact SD—2 by armature SD—1 in parallel with the previously established master ground connection through armature SC—3 and contact SC—4; the ground connection for the ALB lead between the selector and the finder is released at contact SD—3; a ground connection for the finder release magnet FZ is broken at contact SD—9; the incoming or back sleeve lead S is grounded at contact SD—17 as previously described; the tone start lead BRS is grounded through contact SD—8, armature SD—7, contact SMT—1 and armature SMT—2 of the selector metallic through relay SMT; a path is prepared for the operation of the permanent timing relay SPT from one terminal of the winding of relay SPT through armature SD—15, contact SD—14, contact SPT—2, armature SPT—1, office pickup lead OPU to the common equipment panel (see Fig. 14) and the interrupter 71 which grounds the OPU lead periodically; and a path is prepared for the operation of the SMT relay by sleeve ground supplied by the following selector, if any, or the connector, if only one selector is used, over the outgoing or front sleeve lead S, as will be described later.

The establishment of master ground in the selector results in the operation of the selector X-delay relay SXD over a circuit extending from the lower winding relay SXD through off-normal contacts SX*on*—1 and SX*on*—2 to master ground, the other side of the relay winding being connected to battery. Operation of relay SXD results in the application of dial tone to the calling line over a circuit extending from the office dial tone lead (which is found at the right hand side of Fig. 6), contact SH—1 and armature SH—2 of the selector hunt relay SH, contact SXD—3, armature SXD—2, condenser 73, contact SOF—4 and spring or armature SOF—3 of the selector overflow switch SOF, contact SMT—13 and armature SMT—11 to the ring lead R.

A circuit is prepared for stepping the selector step switch SS*w* in the X direction through contacts of the SXD relay. The upper side of the winding of the X magnet winding SX, as viewed in Fig. 5, is connected to battery through the selector overflow contact SOF—2 and spring or armature SOF—1. A circuit to ground for the other side of the SX magnet is prepared through the upper winding of relay SXD, armature SXD—4, contact SXD—5, contact SC—8 and armature SC—7 to master ground, but the circuit is not complete at this time because the SC relay is energized and the circuit is open at contact SC—8.

*First digit.*—The SC relay is connected across the T and R leads. The circuit including the SC relay extends from ground at one coil thereof through contact SMT—10, armature SMT—8, back T lead, subscriber's loop, back R lead, armature SMT—11, contact SMT—13, and lower winding of relay SC to battery. During dialing, this circuit is completed and interrupted at the dial at each impulse of the digit being dialed and causes corresponding energizations and de-energizations of the SC relay. Each time relay SC is de-energized, the above-described circuit for magnet SX is completed and at each energization of the SC relay, ground is removed from the SX magnet so that on each pulse the selector switch SS*w* is stepped one position or level in the X or primary direction.

As soon as the switch SS*w* leaves its normal position, the SX*on* switches are operated. The path over which relay SXD was originally energized is broken at off-normal contact SX*on*—1. This relay is made slow to release, however, and is kept up during dialing by the passage of pulses through the low resistance upper winding thereof, inasmuch as this last mentioned winding is in series with the magnet SX.

Operation of the selector X off-normal contacts also causes the energization of the selector hunt relay SH. Battery is applied at the right hand terminal of the winding of relay SH over a circuit extending from the relay coil through the selector overflow contact SOF—2 and armature SOF—1; and the circuit to ground extends from the other terminal of the winding of relay SH through armature SH—3, contact SH—4, interrupter spring or switch of the selector Y magnet SY, contact SX*on*—3, armature SX*on*—4, contact SXD—6, and armature SXD—7 to master ground.

Energization of the selector hunt relay SH establishes a shunt around armature SXD—7 and contact SXD—6 by engagement between armature SH—6 and contact SH—5. The operation of the SH relay also eliminates dial tone by opening the dial tone circuit at contact SH—1. There is also prepared a path for pulsing the selector switch in the Y direction.

As previously explained, the SXD relay is kept up by the flux resulting from the passage of pulses through its low resistance winding. A short time after the cessation of pulses corresponding to the first digit, relay SXD falls down, thereby completing a circuit from ground to the SY magnet over a circuit extending from master ground through armature SXD—7, contact SXD—8, contact SH—7 and armature SH—8. The other side of the magnet SY is connected to battery through the selector overflow contact SOF—2 and armature SOF—1.

The switch SS*w* hunts in the Y direction for an idle connector using relay SH as a pulse assist relay. Thus, operation of the SH relay energizes the SY magnet. Energization of the SY magnet, and consequent opening of its interrupter contacts, opens the operating circuit for the SH relay. De-energization of the SH relay opens the driving circuit for magnet SY which de-energizes and permits its interrupter switch to close, again energizing relay SH.

After the first step in the Y direction, the circuit for relay SH extends from the left hand terminal of the relay winding over armature SH—3, contact SH—4, Y magnet interrupter switch, X off-normal contact SX*on*—3 and armature SX*on*—4, armature SD—13, contact SD—12, contact SMT—7, armature SMT—5 and front sleeve lead S to the sleeve brush. As long as this path is complete and grounded, as by a busy link in the S bank, the Y magnet steps in the Y direction. Ground energizes relay SH. The closure of armature SH—8 and contact SH—7 energizes the Y magnet SY. Opening of the Y magnet interrupter switch opens the energizing circuit for relay SH and de-energization of relay SH opens the driving circuit for the magnet SY. The finding of an ungrounded terminal prevents operation of relay SH and halts switch movement in the Y direction at that point.

During hunting over the busy links, both terminals of the metallic through relay SMT are grounded. Starting from the right-hand terminal of the relay winding of relay SMT, as viewed in Fig. 5, a circuit to ground extends through armature SD—13, contact SD—12, contact SMT—7, armature SMT—5 to the grounded front sleeve. The other side of the coil is connected to ground through conductors 44 and 45, non-restricted contacts in the XX bank of the selector switch SSw, the XX brush of switch SSw, armature SXD—9, contact SXD—10, contact SD—16, armature SD—17, contact SPT—5 and armature SPT—4. As long as ground is encountered in the sleeve bank of switch SSw, there is no operation of relay SMT. However, the first mentioned terminal of SMT, in addition to the previously described connection to grounded sleeve, may also be connected to battery over a circuit extending from the right-hand terminal of the winding of relay SMT, through X off-normal armature SX*on*—4, off-normal contact SX*on*—3, Y magnet interrupter switch, contact SH—4, armature SH—3, winding of relay SH, selector overflow contact SOF—2 and armature SOF—1 to battery. Thus, recapitulating, one side of SMT is grounded through the XX brush, while the other side is connected to battery through the resistance of relay SH and also to direct ground in the S bank of switch SS*w* whenever a busy link is tested. Whenever a contact without ground is reached, the last mentioned ground is removed and relay SMT picks up and the T, S, and H leads are cut through to the selected connector by the engagement of armature SMT—8 with contact SMT—9, armature SMT—11 with contact SMT—12, armature SMT—5 with contact SMT—6, and armature SMT—15 with contact SMT—14, respectively.

Energization of relay SMT also serves to ground the conversation timing start lead BCTS (Figs. 5 and 6) at contact SMT—1*a*, and armature SMT—2; to ground peg count lead PC over a circuit extending from lead PC through contact SMT—4, armature SMT—3, contact SD—5, armature SD—4 and normally closed make-busy contacts to ground.

Ground is briefly placed on the outgoing or front sleeve lead to cover the period necessary to enable operation of the connector calling and delay relays CC and CD, respectively, and also to prevent another call originating at the called end from seizing the chosen connector. Upon operation of relay CD, holding ground is established for relay SMT from the winding of relay SMT by way of leads 44 and 45, the XX bank, non-restricted lead, armature SXD—9, contact SXD—10, contact SMT—6, armature SMT—5, front sleeve lead S, S brush and contact of switch SS*w*, the upper winding of relay CSL, normally closed contacts of relays CRT and CSD connected in shunt, contact CD—12 and armature CD—11 to ground. It will be recalled that relay SMT is energized and that the connector choosing digit has been completed, but the selector delay relay SD, being slow to release, has not yet dropped. Hence, the temporary ground connection extends from ground at armature SPT—4, through contact SPT—5, armature SD—17, contact SD—16, contact SMT—6, armature SMT—5 and the front sleeve lead. Operation of relay SMT de-energizes relays SC and SD by the opening of circuits at armature SMT—11 and SMT—8, and armature SC—1, respectively. Complete release of relay SD, after a time delay, removes the temporarily grounded sleeve at armature SD—17, opens the tone start lead BRS at contact SD—8, and opens the peg count lead.

*Connector*

The calling relay CC is a two-winding relay connected across the tip and ring leads, T and R, respectively. Therefore, as soon as these leads are cut through to the connector, relay CC is energized. Operation of relay CC establishes master ground from a circuit extending from local ground at armature CPT—1, through contact CPT—2, armature CC—1 and contact CC—2. Energization of relay CC also results in the energization of delay relay CD. The complete energizing circuit extends from battery, through the winding of relay CD, contact CC—5, armature CC—3, contact CPT—2, and armature CPT—1 to ground. Relay CD is also connected to master ground through armature CC—1 and contact CC—2, armature CC—3 and contact CC—5. Operation of relay CD provides a second path for master ground in shunt with armature CC—1 and contact CC—2, through armature CD—1 and contact CD—3, which will not be affected by subsequent pulsing.

The connector X-delay relay CXD is energized from master ground over a circuit extending from the X off-normal armature CX*on*—3 and contact CX*on*—4 through the lower winding of relay CXD to battery. An energizing circuit for the connector Y delay relay CYD is completed from master ground through the Y off-normal armature CY*on*—3 and contact CY*on*—4 and the lower winding of CYD to battery.

Energization of relay CD also closes the pickup lead OPU (Figs. 6 and 7) to the winding of the permanent time relay CPT to enable reception of pulses from the common timing equipment (see Fig. 7). The last-mentioned circuit extends from lead OPU through armature CPT—5, contact CPT—6, contact CA—9 and armature CA—10 of the connector answering relay CA, contact CD—10, armature CD—9, and winding of relay CPT to battery. Any pulses of ground received over the pickup lead are effective to energize relay CPT.

The tone start lead BRS is also grounded by the operation of relay CD, the circuit extending from ground at armature CD—4 by way of contact CD—5, armature CRT—6 and contact CRT—8 of ring through relay CRT to the lead BRS which results in the energization of any common equipment. Referring to Fig. 14, the appearance of ground on the BRS lead causes the office ringing and tone start equipment to be placed into operation as will be described later.

The second, third and fourth digits of the number being called may now be recorded.

*Second digit.*—Dialing of the second digit causes pulsing of relay CC. Pulsing ground is fed to the X magnet CX as follows: battery, overflow contacts COF—1, magnet CX, upper winding of relay CXD, contact CXD—5, armature CXD—3, contact CON—10 and armature CON—9 of the connector off-normal relay CON, contact CSD—16 and armature CSD—14 of relay CSD, contact CD—8, armature CD—6, contact CC—4, armature CC—3, armature CD—1 and contact CD—3 to master ground. The high resistance or lower winding of relay CXD is de-energized after the first step in the X direction because of the opening of the off-normal armature CX*on*—3, and contact CX*on*—4, but relay CXD remains held up during the dialing of the second digit because of the passage of dialing pulses through the upper or low resistance winding. This follows because of the slow release characteristics of the relay. A predetermined time after the passage of the last pulse of the second digit, however, relay CXD releases.

*Third digit.*—In order to cause the connector switch to step in the Y direction, the next digit is fed to the Y magnet CY over a path prepared by the release of CXD following termination of the second digit. One side of the magnet winding CY extends to battery through the overflow switch COF—1. The other side of magnet coil CY extends to ground through the low resistance or upper winding of relay CYD, contact CYD—4, armature CYD—3, contact CXD—4, armature CXD—3, contact CON—10, armature CON—9, contact CSD—16, armature CSD—14, contact CD—8, armature CD—6, contact CC—4, armature CC—3, contact CPT—2 and armature CPT—1. Armature CC—3 is also connected to master ground through armature CD—1 and contact CD—3. The high resistance or lower winding of relay CYD is de-energized immediately after the first step in the Y direction because of the opening of the Y off-normal contacts CY*on* and armature CY*on*—3, but is maintained in the energized position by the passage of stepping current representing dial pulses through the low resistance upper winding. After a predetermined delay interval following the reception of the last pulse of the third digit, relay CYD releases.

*Busy test.*—During stepping in the Y direction of the connector switch CS*w*, the upper winding of busy test relay CBT is applied to the sleeve brush by means of a circuit extending from battery through the upper winding of relay CBT to ground by means of contact CYD—6, and contact CYD—7 to the front sleeve lead S. Relay CBT is, therefore, operated each time the sleeve brush passes over a grounded terminal in the sleeve bank of switch CS*w*.

If, on reaching the called line, that line is found to be busy, relay CBT is held operated by sleeve ground. The subsequent release of relay CYD locks relay CBT to local ground, the circuit extending from battery through the upper winding of relay CBT, contact CYD—6, armature CYD—5, contact CBT—10, armature CBT—9, contact CRT—19 and armature CRT—18 of ring through relay CRT, and armature CSD—17 and contact CSD—18 in parallel therewith, contact CD—12 and armature CD—11 to ground. Busy tone is routed to the ring lead R from the office busy tone and flash lead OBTF over a circuit extending through armature CBT—11, contact CBT—12, armature CTH—1 and contact CTH—2 of the trunk hunt relay CTH, contact CCT—11 and armature CCT—10 of the connector cut through relay CCT to the back portion of ring lead R by way of conductors 46, 47 and 48.

*Cut through.*—If the selected line is not busy, relay CBT is released and unoperated at the time relay CYD releases following cessation of the impulses corresponding to the third digit. The front sleeve lead is transferred to the lower or low resistance winding of relay CCT. The left-hand terminal of the lower relay winding, as viewed in Fig. 9, extends to ground through a circuit including contact CBT—8, armature CBT—9, contact CRT—19, armature CRT—18 with armature CSD—17 and contact CSD—18 in shunt therewith contact CD—12 and armature CD—11. The other side of the lower winding of relay CCT extends to battery through contact CYD—10, armature CYD—8, the front sleeve lead, sleeve brush, contact or terminal in the sleeve bank, sleeve lead to the called line circuit, armature L'LO—8 and contact L'LO—9 of the called line lock-out relay L'LO, and winding of cut-off relay L'CO. The cut-off relay L'CO operates in series with the cut through relay CCT. The relay CTT is preferably a two-step relay such as that shown and described in a co-pending application of Andrew W. Vincent, Serial Number 647,890, filed February 15, 1946, and assigned to the same assignee as the present invention and is used to insure complete operation, even though the initial energization is made through the series circuit. The foregoing circuit causes relay CCT to make the first step contact (armature CCT—1 and contact CCT—2) which completes an obvious circuit to master ground for the high resistance (upper in this example) winding of relay CCT to fully operate the relay. Full operation of relay CCT closes armature CCT—4 and contact CCT—3 and also armature CCT—6 and contact CCT—5, in the tip and ring leads, respectively. It should be noted that if two connectors test the same line simultaneously, there is insufficient current to operate the cut through relay CCT.

*Fourth digit.*—Although the busy test and cut through operation is usually completed by the time the fourth digit starts, the recording of this digit is independent thereof and may take place simultaneously. A connection is prepared for recording the fourth digit by means of the relay CSD, which operates upon the release of relay CYD. The circuit extends from battery at one terminal of the winding of relay CSD through the relay coil, armature CRT—11, contact CRT—10, armature CYD—2, contact CYD—1, contact CON—5, armature CON—4, and the Y off-normal contact CY*on*—5 and armature CY*on*—3 to master ground. Forward tip and ring leads, T and R, are transferred from the T and R brushes of minor switch CS at armatures CSD—9 and CSD—12, respectively, to the back T and R conductors, thus establishing a metallic path between calling and called lines and completing an obvious circuit to energize the answering relay CA upon answer by the called subscriber since it is connected across the T and R leads or conductors. The foregoing means provides supervision to a calling toll operator on delayed toll ringing. This last-mentioned circuit furnishes talking current and a signal to the operator in the event that the fourth digit is delayed in toll service.

Operation of relay CSD also completes a path for ringing the called party including the stepping magnet of the minor switch CS which may be of the rotary type. A circuit for the stepping magnet CS*a* extends from battery through windings CS*a*, contact CSD—15, armature CSD—14, contact CD—8, armature CD—6, contact CC—4 and armature CC—3, armature CD—1 and contact CD—3 to master ground. The off-normal contacts CS—1 of minor switch CS are closed following the first step corresponding to the first pulse of the fourth digit to complete an obvious circuit for energizing the off-normal repeating relay CON. Operation of relay CON transfers the winding of relay CSD from master ground through armature CON—4 to master ground through contact CON—3, contact CSD—15, armature CSD—14, contact CD—8, armature CD—6, contact CC—4, armature CC—3, armature CD—1 and contact CD—3. Since armature CC—3 connects contact CC—4 to master ground at each pulse of the digit being transmitted and since relay CSD has slow release characteristics, relay CSD is held operated by the pulsing ground. The minor switch CS steps or advances to the terminal corresponding to the party desired on the chosen line, as determined by the fourth digit, and in that position completes a connection to an office generator of predetermined ringing frequency (office generator No. 1 with the connections shown in Fig. 9 if switch CS*a* moves five steps). Only one generator connection is shown. The others may be the same except that different frequencies are preferably employed. Relay CSD releases at the end of the digit and returns outgoing tip and ring leads T and R to the minor switch by reengagement of armatures CSD—9 and CSD—12 with contacts CSD—10 and CSD—13, respectively. A ringing circuit is now completed from the front tip conductor through armature CCT—4, contact CCT—3, armature CSD—9, contact CSD—10, armature CRT—13, contact CRT—14, brush and contact of section T of switch CS to the selected office generator. The circuit from forward ring lead R extends through armature CCT—6, contact CCT—5, armature CSD—12, contact CSD—13, armature CRT—16, contact CRT—17, brush and contact of section R of switch CS, and the lower winding of relay CRT to ground.

*Ringing trip.*—The lower winding of relay CRT is shunted by a resistor 74 and also by a condenser 75 of sufficient capacity to present relatively small impedance to the alternating current of the ringing frequency. Since the called line is open as far as a direct current path is concerned, relay CRT does not operate during ringing but upon lifting of the receiver at the called station, a metallic connection between the ring and tip leads is completed. As a result, the superimposed battery 77 in the ringing circuit sends current on a loop basis through the transmitter at the called end and relay CRT is energized through its lower winding. Relay CRT is preferably a two-step relay, and at the first step completes a circuit to energize the upper winding from master ground through contact CRT—3 and armature CRT—1. When fully energized, the circuit including the ringing generator is broken or tripped and a complete metallic talking circuit is completed by the movement of armatures CRT—13 and CRT—16 from engagement with contacts CRT—14 and CRT—17 into engagement with contacts CRT—12 and CRT—15, respectively. The complete metallic circuit energizes answering relay CA, which operates to reverse the tip and ring leads for reasons well understood by those skilled in the art but not discussed herein.

The minor stepping switch CS is now released by a self-interrupting circuit, including battery, the release winding CS*b*, contacts CS—2, contact CRT—5, armature CRT—4, contact CBT—2 and armature CBT—1 to ground.

Both front and back sleeve leads are grounded by the engagement between armature CCT—7 and contact CCT—8. Back sleeve is connected directly to armature CCT—7 and to ground through contact CSD—18, armature CSD—17, contact CD—12 and armature CD—11, whereas the front lead is connected to the same ground source at armature CCT—7 by engagement between armature CCT—7 and contact CCT—8. Upon receipt of ground at the called line over the front sleeve connections, the cut-off and lock-out relays L'CO and L'LO are operated as previously described for the calling line, and the tip and ring connections to the line relay L'L are broken by the operation of the cut-off relay L'CO to prevent the operation of the allotter and a line finder-selector link when the called line answers.

There is illustrated in Figs. 9 and 10 a divided ringing circuit. Thus, the lower high resistance winding of ring trip relay CRT is connected to the ringing generator ground and the coil as previously explained is shunted by resistance and capacitance to permit passage of the alternating ringing current without operating the relay. Reference to the lower portion of Fig. 9 indicates that office generators of different frequency are connected to the first five contacts of the T section and to the last five contacts of the R section of switch CS. The second five contacts of the T section and the first five contacts of the R section are all connected together so that if the switch stands on any one of the first five positions, a circuit extends from the R brush of switch CS through contact CRT—17, armature CRT—16, contact CSD—13, armature CSD—12, contact CCT—5, armature CCT—6, ring brush R, R bank, called subscriber's loop, T bank, T brush, armature CCT—4, contact CCT—3, armature CSD—9, contact CSD—10, armature CRT—13, contact CRT—14, brush and contact of section T of switch CS, winding of the transformer 76 which is energized by the office generator and superimposed battery 77 to ground. With this arrangement, ringing of two parties can be accomplished for each frequency. When the switch CS is on one of the first five positions, the bells connected to the T lead ring according to frequency, and in positions 6 to 10, inclusive, the bells connected to the R lead ring according to frequency. If loop ringing is desired, the subscriber's loop circuit may be revised, as shown in Fig. 3, to connect the condenser and bell between tip and ring leads instead of between one of these leads and ground whereby only one party can be rung for each frequency and the connections for contacts 6 to 10 of the switch sections T and R of switch CS may be omitted. If divided ringing is employed, as shown in solid lines in Fig. 10, relay CRT is connected to the called loop only during ringing on the side to which relay CRT is connected and the resistor 74 and capacitor 75 may be omitted since an A. C. path is not required around relay CRT.

In order to return ringing tone to the calling subscriber, there are provided condensers 88 and 89 connected in series between the T and R brushes of minor switch CS. The common connection between condensers 88 and 89 is connected to the back ring lead by means of a circuit extending through contact CRT—21, armature CRT—22, condenser 83, contact CCT—9, armature CCT—10, and conductors 46, 47 and 48. Some of the ringing frequency is thus by-passed to the back ring lead by condenser 88 or condenser 89 depending upon whether the line being called is connected to the tip side or to the ring side of the called line.

*Release of call*

When the calling party hangs up, the short circuit connection across the tip and ring leads is removed which results in the de-energization of relay CC if the called party hanging up, or calling relay CC if the calling party hangs up, which causes de-energization of relay CD at contacts CC—5 and armature CD—3, removal of master ground at armature CC—1 and contacts CC—2, and restoration of all equipment to a condition of readiness for the next call.

The connector step-by-step switch CS*w* is returned to normal by the operation of the release magnet CZ, following de-energization of relay CD, through a circuit including battery, the winding of magnet CZ, the Y off-normal armature CY*on*—1 and contacts CY*on*—2 in shunt with the X off-normal armature CX*on*—1 and contact CX*on*—2, contact CD—7, armature CD—6, contact CC—4, armature CC—3, contact CPT—2, and armature CPT—1 to ground. Energization of magnet CZ causes withdrawal of the holding pawls of the switch and the return springs become effective to return the switch to its normal position in both X and Y directions. In order to insure return of the switch to normal before an attempt is made to switch another call, a locking circuit is provided for magnet CZ through its contacts CZ—1 and the X and Y off-normal contacts. The locking circuit is broken when the switch reaches its normal position because the off-normal switches open the locking circuit.

In the selector, removal of ground from the front sleeve lead due to the above-described release of relay CD releases magnet SMT. An energizing and locking circuit for the selector release relay SZ, similar to that provided in the connector, is utilized to return the selector step-by-step switch CC*w* to its normal position.

With respect to the finder, de-energization of relay SMT grounds the release lead Z extending between the selector and the finder, the circuit extending from ground at armature SMT—2 through contact SMT—1, armature SD—10, contact SD—9 to the Z lead. The grounded Z lead is connected to one terminal of the winding of finder release magnet FZ through X and Y off-normal contacts connected in shunt. The other side of the winding of magnet FZ is connected directly to battery. No locking scheme is provided to keep magnet FZ energized until the switch reaches home, because the link idle lead LI is maintained open at armature FZ—1 as long as magnet FZ is energized.

*Revertive calling*

There are illustrated in the drawings two methods of providing revertive call service. According to one method shown in Figs. 15 and 16, the calling party dials a special number, such as 9, for example, and then dials digits representing the called and calling stations. Both bells ring alternately. When this arrangement is used, the circuit elements enclosed within the rectangle E of Fig. 7 are omitted and wiring "Y" is used.

The second type or method omits the elements illustrated in Figs. 15 and 16, and uses the components shown within the rectangle E of Fig. 7. In this case, wiring "X" is used. In accordance with the second method, the calling party dials the regular directory number of the called party. After dialing is completed and the busy tone is returned, the calling party hangs up until it is believed that the called party has had time enough to answer the call. He then again removes his receiver. In this arrangement, ringing is carried out only at the called station.

*First method.*—The reverting call circuit shown in Figs. 15 and 16 is described first. There are shown connections providing 10-party, harmonic, full selective, revertive call ringing. The progress of a call is the same as that described for a call to a subscriber on another line up to the point where the selector step-by-step switch SS*w* operates. The tip, ring, and sleeve connections from the connector are not connected into the bank of switch SS*w*. Instead, ring, tip and sleeve leads from the reverting call circuit are connected into a revertive call level of switch SS*w* so that the selector is cut through to the revertive call circuit instead of to a connector and hence is operated as soon as the selector step switch SS*w* cuts through to energize revertive calling relay RC in the same manner as calling relay CC in a straight through call.

Operation of relay RC causes the energization of the first selector delay relay R1SD over a circuit extending from battery through the lower winding of R1SD, off-normal switch R1S*on*—2, contact RC—3 and armature RC—2 to ground. The operation of relay RC also results in the energization of the second selector delay relay R2SD over a circuit extending from battery through the lower or high resistance winding of relay R2SD, off-normal switch R2S*on*—2, contact RC—3 and armature RC—2 to ground.

Revertive calling delay relay RD is energized over ground supplied from the permanent timing relay RPT over a circuit extending from battery through the winding of relay RD, contact R2SD—4, armature R2SD—5, contact RC—5, armature RC—4, contact RPT—4 and armature RPT—5. A locking circuit is provided for relay RD to the same ground through armature RD—9 and contact RD—8.

*Second digit.*—The system is now prepared for the transmittal of the second digit of the number being called (the first digit having been a special digit such as "9" utilized to cut through to the revertive call level). The calling relay RC responds to the dial impulses and steps the first frequency selecting switch R1S, which in the illustrated form of this invention is a rotary type switch, over a circuit extending from battery through the rotary magnet winding R1S*a*, the upper or low resistance winding of relay R1SD, contact R1SD—3, armature R1SD—2, contact R2SD—1, armature R2SD—2, contact RD—7, armature RD—6, contact RC—1 and armature RC—2 to ground. The off-normal contacts R1S*on* operate on the first step of switch R1S to break the operating circuit for relay R1SD at off-normal R1S*on*—2. However, the dial pulses passing through the upper or low resistance winding of R1SD maintain the latter operated during the pulsing time corresponding to the second digit. At the end of the second digit, relay R1SD releases to prepare a pulsing path for the second frequency selective switch R2S over a circuit from battery through the rotary magnet winding R2S*a*, the upper or low resistance winding of relay R2SD, contact R1SD—1, armature R1SD—2, contact R2SD—1, armature R2SD—2, contact RD—7, armaure RD—6, contact RC—1, and armature RC—2 to ground.

*Third digit.*—Receipt of the third digit causes switch R2S to step in a manner similar to that explained in connection with the operation of switch R1S under the control of relay RC. As soon as R2S takes its first step, off-normal contacts R2S*on*—2 are opened to interrupt the operating circuit of relay R2SD, but the pulsing current through the holding winding of relay R2SD prevents release of that relay until the end of the digit.

As soon as R2SD releases, relay R1SD reoperates over a circuit extending from battery through the lower or high resistance winding of R1SD, armature RD—10, contact RD—11, armature R2SD—6, contact R2SD—7, contact R1SD—5, armature R1SD—4, contact RC—5, armature RC—4, contact RPT—4 and armature RPT—5 to ground. Relay R1SD is locked up over a circuit extending from the lower coil thereof through armature RD—10, contact RD—11, armature R2SD—6, contact R2SD—7, contact R1SD—5, contact R1SD—6, contact RD—3 and armature RD—2 to ground and prepares a holding path for ring trip relay RRT at armature R1SD—10.

After completion of the third digit, the calling party hangs up. Relay RC is de-energized by the opening of the calling loop. The ringing relay RR then operates over a circuit extending from battery at one terminal of the coil of relay RR to ground through armature R1SD—8, contact R1SD—7, contact R2SD—3, armature R2SD—2, contact RD—7, armature RD—6, contact RC—1 and armature RC—2. Operation of relay RR maintains relay RD operated over a circuit extending from battery, through the winding of relay RD, armature RD—9, contact RD—8, contact RR—12, armature RR—11, contact RRT—7, armature RRT—8, contact RPT—4 and armature RPT—5 to ground. Upon operation of relay RR, circuits are also prepared for operating the switching relays R1SW and R2SW at armatures RR—3 and RR—1, respectively, and the tip and ring leads are cut through at armatures RR—6 and RR—9, respectively.

The switching relays are operated alternately by means of pulses from a common timing circuit (not shown). Pulses of ground appear on the ground leads 78 and 79 (see lower portion of Fig. 15). Ground lead 78 energizes switching relay R1SW through armature RR—3 and contact RR—4. Switching relay R2SW is operated by pulses over the second ground lead 79 through armature RR—1 and contact RR—2.

Ringing voltage is fed alternately from brushes of the frequency selector switches to the line. In one case, the circuit extends from the selected generator source, contact and brush of section 87 of the selector switch R1S, contact R1SW—4, armature R1SW—5, contact RR—10, armature RR—9, contact RRT—4, armature RRT—3, R lead to the line circuit, subscriber's loop, T lead, armature RRT—1, contact RRT—2, armature RR—6, contact RR—7, armature R1SW—2, contact R1SW—1, brush and contact of section 86 of selector switch R1S, condenser 80, shunting the lower winding of relay RRT to generator ground lead 91.

Alternate ringing is carried out over a circuit extending from the other selected generator, contact and brush of section 84 of selector switch R2S, contact R2SW—1, armature R2SW—2, contact R1SW—3, armature R1SW—2, line circuit including tip and ring leads and subscriber's loop, armature R1SW—5, contact R1SW—6, armature R2SW—5, contact R2SW—4, brush and contact of section 85 of selector switch R2S, and condenser 80 shunting the coil of relay RRT to the generator ground lead 91. Inasmuch as the contacts of the switching relays are interlocked, it is seen that the two ringing frequencies are applied to the line alternately.

When either party involved in the call lifts his receiver and completes a connection between tip and ring leads, direct current flows through the operating winding of ring trip relay RRT to operate it. When both switching relays are released, resistance battery is supplied to the line at contact R2SW—6, the circuit extending through armature R2SW—5, contact R1SW—6, armature R1SW—5, ring lead, subscriber's loop, tip lead, armature R1SW—2, contact R1SW—3, armature R2SW—2, contact R2SW—3, lower winding of relay RRT to the generator ground lead 91. Relay RRT locks to ground through its upper winding, the circuit comprising battery, upper winding of relay RRT, contact RRT—11, armature RRT—10, contact R1SD—11 and armature R1SD—10 to ground. The tip, ring and sleeve leads are opened at contacts RRT—2, RRT—4, and RRT—6, respectively. The line circuit is locked out because the removal of sleeve ground therefrom de-energizes lock-out relay LLO and release cut-off relay LCO. The release of the cut-off relay again completes an energization circuit for line relay LL. The lock-out relay LLO is slow to release so that ground over armature LL—3 and contact LL—4, armature LLO—11 and contact LLO—10, contact LCO—7 and armature LCO—6 completes a circuit to re-operate the lock-out relay LLO. Therefor, the line start, X-mark and H grounds are eliminated, so that the line finder and the selector are released.

When the ring through relay RRT operates, holding ground for relay RD is removed at armature RRT—8 and contact RRT—7. Relay RD releases after a time delay. The release of relay RD breaks the energizing circuit for relay R1SD at armature RD—1 and contact RD—3. The release of relay R1SD, which is also slow to release, results in a de-energization of ringing relay RR at contact R1SD—7 and armature R1SD—8 and the energizing circuit for ringing trip relay RRT is broken at contact R1SD—11 and armature R1SD—10.

When the delay relay RD operates upon seizure, a path is prepared over which pulses of ground received over the pickup lead OPU may be utilized to operate the permanent timing relay RPT. The circuit comprises lead OPU, armature RD—16, contact RD—17, armature RPT—2, contact RPT—3, and winding of relay RPT to battery. Relay RPT locks up to ground through contact RPT—3, contact RPT—1, contact RD—3 and armature RD—1. The ground which operates and holds relay RD is then transferred to ground supplied by the common timing equipment over the hold lead OH, the circuit extending through contact RPT—6, contact RPT—4, armature RC—4, contact RC—5, contact RD—8, armature RD—9, and winding of relay RD to battery.

If the ringing circuit is not tripped before the time allotted by the common timing equipment has expired, holding ground over lead OH is removed to release relay RD. When relay RD releases, sleeve ground is removed at contact RD—12 so that the line is locked out and the line and trunk are dismissed.

It is desirable to provide means for distinguishing between hangup by the calling subscriber before completion of the third digit and actual dialing of the third digit. In other words, it is desired to provide means to prevent putting through a false call after the calling party terminates the calling operation by replacing his receiver on the hook switch before completion of the dialing operation.

It will be recalled that the revertive calling relay RC and means including a first delay relay R1SD and step switch R1S are utilized to identify the calling party in response to a group of dialed pulses (actually the second digit dialed because the first digit causes seizure of the revertive calling circuit) and the calling relay cooperates with means including the second delay relay R2SD and the step switch R2S to identify the called party on another group of dialed pulses (the third digit). Now, if the calling party hangs up before completion of the third digit, operation of the hook switch simulates dialing of the numeral 1, because opening of the hook switch contacts causes the release of calling relay RC, which in turn causes switch R2S to take one step. If hang-up occurs during the return to normal of the dial following dialing of the third digit, switch R2S is moved one additional step. Similarly, if hang-up precedes the third digit, the switch may move one step.

It will be recalled that normally, delay relay R1SD is reoperated at the end of the third digit and relay R2SD is released to prepare a holding circuit for ring trip relay RRT. Relay R1SD locks up after re-energization. Thereafter, when the calling party hangs up, relay RC is de-energized, ring relay RR is then energized to maintain relay RD energized or operated and the switching relays R1SW and R2SW operate alternately to ring both parties. When either party lifts his receiver, ring trip relay RRT is energized and locks to ground through relay R1SD.

In order to prevent the establishment of ringing and talking circuits on hang-up before completion of the third digit, means is provided to prevent the re-energization of delay relay R1SD. Thus, if the digit "1," for example, or some other digit, is dialed, relay RC is energized as soon as the last pulse is transmitted whereby delay relay RD is kept operated to maintain a circuit for the re-energization of relay R1SD at armature RD—10 and contact RD—11, but if the calling party hangs up before completion of the third digit, relay RC remains de-energized and shortly thereafter slow-to-release relay RD releases and opens the energization circuit for relay R1SD at armature 10.

*Second method.*—If directory number revertive call service is provided, the circuits shown in Figs. 15 and 16 are omitted and the circuit elements included within the rectangle E of Fig. 7 are provided and wiring "D," "W," and "X" is used. In the following description it is assumed that wiring "C" is used in Fig. 8, i. e., trunk hunting is provided.

When the called line is found to be busy, the revertive call relay CRC is energized, the circuit extending from battery through the winding of relay CRC, armature CTH—3, contact CTH—4, armature CBT—14, contact CBT—13, contact CSD—7, contact CSD—6 to ground. It is noted at this point that relay CRC does not operate if the busy line is the first of a trunk group in which case relay CTH is energized and the foregoing circuit is broken at contact CTH—4.

Operation of relay CRC grounds front sleeve, the circuit extending from ground at armature CD—11 through contact CD—12, armature CRT—18, contact CRT—19, contact CRC—9, contact CRC—10, armature CRD—13, and contact CRD—12 to the front sleeve lead. If any but the calling line is chosen, relay CSL operates on holding current being fed to the preceding selectors and line circuit relays, but if the calling line is chosen, holding current is furnished by the front sleeve and relay CSL is shunted over a path extending between the connector and finder multiples, i. e., ground is found on both front and back sleeves, the former through contact CRD—12, armature CRD—13 and contacts CRC—10 and CRC—9, and the latter by direct connection. Hence, relay CSL operates on a normal call but not on a reverting call. Once operated, relay CSL locks up to master ground through contact CSL—5 and armature CSL—6.

The challenge of the busy test is concluded by the operation of reverting delay relay CRD which is slow to operate. The energizing circuit for relay CRD extends from battery through the winding of relay CRD, contact CRD—10, armature CRD—11, contact CRC—8, and armature CRC—7 to master ground. The original path for the tip and ring leads, T and R, is broken at armatures CRD—1 and CRD—3, respectively, but an alternate path is established at armature CRC—1 and contact CRC—2, and armature CRC—3 and contact CRC—4 of relay CRC, respectively.

As explained previously, on revertive calls, relay CSL remains unoperated. After the third connector digit of the called number is completed, relay CSD releases and establishes a new path for the energization of relay CRC, the circuit therefor extending from battery through the winding of relay CRC, armature CTH—3, contact CTH—4, armature CBT—14, contact CBT—13, armature CC—6, contact CC—7, contact CON—6, armature CON—7, armature CSD—5 and contact CSD—6 to ground.

Relay CON, previously operated, completes a circuit for impressing busy tone on the ring lead, the circuit extending from the busy tone and flash lead OBTF (Fig. 8) through armature CBT—11, contact CBT—12, armature CTH—1, contact CTH—2, contact CCT—11, armature CCT—10, contact CON—2, armature CON—1, contact CSD—2, contact CSD—1, and conductors 47 and 48 to the ring lead R. Upon opening of the contacts at the hook-switch upon hang up at the calling station, relay CC releases and opens the last established path for relay CRC, which drops out and opens the back tip and ring connections at armatures CRC—1 and CRC—3, respectively. The original energizing path for relay CD is opened upon the release of relay CC but a new energizing path for relay CD is provided from battery through the winding of relay CD, contacts CSL—4, armature CSL—3, contact CRD—14, armature CRD—15, contact CRT—2 and armature CRT—1 to master ground. Since master ground is established by the closure of contacts on relay CC and relay CD, the connection is now locked up even though the tip and ring leads are not closed. The release of relay CRC also completes a path for the operation of cut-through relay CCT through its upper winding over a circuit extending from battery through the upper winding of relay CCT, contact CSL—7, armature CSL—8, contact CRD—7, armature CRD—8, contact CRC—6*a* and armature CRC—7 to master ground. The operation of CCT extends the front tip and ring leads to the ringing network of the connector at armatures CCT—4 and CCT—6, respectively.

When the called party answers, or the calling party again lifts his receiver, i. e., when an off-hook condition again occurs after ringing commences, relay CRT is energized as it is during a normal call. Front tip and ring connections are transferred to the answering relay CA until lock-out is established. Operation of CRT opens the second operating path for relay CD at contacts CRT—2 and armature CRT—1. After a time delay, relay CD releases to complete a circuit to the connector release magnet CZ. One side of the winding of magnet CZ (lower terminal as viewed in Fig. 8) is connected directly to battery while the other side of the winding of magnet CZ is connected to ground through the parallel X and Y off-normal switches, contact CD—7, armature CD—6, contact CC—4, armature CC—3, contact CPT—2 and armature CPT—1 to ground. Release of relay CD also removes the sleeve ground at contact CD—11 and armature CD—12, thereby dropping the preceding selectors and locking up the line.

In Fig. 18, there is shown a modification of the second revertive calling circuit according to which a separate relay is used for cut through of reverting calls. Circuit connections for the connectors are generally the same except for the addition of relay CRCT. The dotted lines 59 and 60 indicate the connections of the first-described system and are used if relay CRCT is omitted. When the calling party hangs up after receiving the busy signal, relay CRC releases as previously described, and completes a circuit for energizing revertive call cut-through relay CRCT from master ground through armature CRC—7, contact CRC—6, armature CRD—8, contact CRD—7, armature CSL—8, contact CSL—7, and relay winding CRCT to battery. Energization of relay CRCT interrupts the busy tone circuit at armature CRCT—5 and cuts through tip and ring leads T and R at armatures CRCT—1 and CRCT—3. Ringing then proceeds as previously described and when the call is answered, relay CRT picks up to complete the talking circuit.

If trunk hunting is not utilized, wiring "D" is used and rectangle "F" is omitted, but the operation of the revertive call circuit remain the same.

SPECIAL CONDITIONS AND FEATURES

*Line circuit*

*All links busy.*—When all of the finder-selector circuits provided for servicing a given number of lines are busy, there is, of course, no line finder-selector combination available to the calling party. Hence, no sleeve ground is returned to the line circuit and neither cut-off nor lock-out relay is energized. Under this condition, the two all links busy relays ALB and A'LB in the dual allotter are released and the all links busy tone is transmitted to the line circuit and to the calling station. Referring to Fig. 12, the circuit comprises a grounded tone source (not shown), the lead marked ALB Tone In, armature ALB—14, contact ALB—15, contact A'LB—15, armature A'LB—14 and the lead marked ALB Tone Out to the line circuit of Fig. 3.

*Coin box tone.*—When coin box tone is desired, there may be provided a tone source superimposed on the 48-volt D. C. supply as shown in dotted lines in Fig. 3. Both tone source and direct current supplies are connected in series with the sleeve lead and are paralleled with the cut-off and lock-out relays. The coin box tone is sent through the sleeve lead to the trunks to notify an exchange operator that a coin box user is dialing. For this reason, the signal is impressed upon trunks extending to the operator rather than to a connector.

*Lock-out.*—Lock-out is a situation initiated by a load across the tip and ring conductors or the elimination of sleeve ground. In order to avoid holding indefinitely a finder-selector link because of a permanent fault on the line, a condition which causes operation of the line, cut-off and lock-out relays as for a call, common timing equipment is provided to open the sleeve lead, allowing the line finder, selector and cut-off relays to release. Pulses of ground received over pick-up lead OPU energize relay SPT (Fig. 6) which transfers sleeve ground at armature SPT—4 to hold ground over hold lead OH and contact SPT—6 and SPT—5. Thus, when the hold lead is opened by timing of the common timing equipment, back sleeve ground is removed, and cut-off relay LCO is de-energized.

When the cut-off relay LCO releases, a circuit including the tip and ring leads is again completed by the fault and the line relay LL re-operates. The lock-out relay LLO, which is slow to release, remains operated during the time the cut-off relay is releasing and for a further period sufficient to enable the line relay LL to be re-operated through engagement of armatures LCO—1 and LCO—3 with contacts LCO—2 and LCO—4, respectively.

Re-operation of the line relay LL locks up lock-out relay LLO to ground over a circuit from ground at armature LL—3 through contact LL—4, armature LLO—11, contact LLO—10, contact LCO—7, armature LCO—6, winding of relay LLO to battery. The line and lock-out relays are now operated. The line start and X-mark leads are open at contact LLO—5 and the H-mark lead is open at contact LLO—12, thereby preventing the line circuit from holding a finder-selector combination. Under lock-out conditions, an alarm lamp 81 may be energized over a circuit from ground to battery including armature LL—1, contact LL—2, armature LLO—4, contact LLO—6 and alarm lamp 81.

*Line finder and allotter*

*All links busy.*—If either all links busy relay ALB or A'LB releases because of a blown fuse, the throwing of disable key DK, or because all links normally served by that side of the allotter are busy, the allotting functions are transferred so that the other side or half of the allotter can carry the entire load of the line group being served by the dual allotter.

Let it be assumed that the portion of the allotter shown in Fig. 11 and left-hand portion of Fig. 12 is busy, in which case relay ALB is de-energized. Means is provided for transferring the functions normally performed thereby to the allotter portion illustrated in the right-hand portion of Fig. 12 and Fig. 13. The relays of the portion shown in Figs. 12 and 13 are designated by the same letters as their counterparts of Fig. 9 except that a "prime" mark is applied to the letter "A" signifying "allotter".

Upon the release of relay ALB, armature ALB—5 engages contact ALB—4 and thereby connects together the two start leads LST and L'ST at the armature A'LB—5. The link idle levels 64 and 65 of selector switch A'LS are tied together by the engagement of armature ALB—8 with contact ALB—7, so that all links are available to the operating side (shown in Figs. 12 and 13). As previously explained, half of the lines are normally associated with one side of the allotter and the other half with the other side. If all lines are completely multiplied, the line connected to the first level reached by a finder will be seized and a line connected into one of the last levels to be reached by a switch will sometimes get relatively poor service if traffic is heavy. In order to provide priority for the lines associated with levels 6 to 0, the X mark leads corresponding to lines terminating in levels 1 to 5 are connected only to the X level of the finder switches intended to serve levels 1 to 5 and are omitted from the X level of the finder switches intended normally to serve levels 6 to 0. All X mark leads into levels 6 to 0 are connected. If the allotter serving lines terminating in banks 1 to 5 is removed from service, means must be provided for extending X mark leads into the unconnected levels. For this purpose, bank splitting relay ABS is provided. Relay ABS is energized by engagement of armature ALB—12 and contact ALB—11 and the X mark leads are then completely multipled throughout the X levels.

If the disable key DK is operated, the energizing circuit for relay ALB is broken at spring DK—3. Relay ALB releases and its functions are transferred to the other half of the allotter as described above.

If, after transfer of functions, any link becomes idle, the allotting function is transferred back to the first side because as soon as a link is returned to normal, the Y off-normal contacts in both selector and finder close to re-energize relay ALB the first half of the allotter. If a link becomes idle during the period of an allotting action, transfer back takes place at the end of that period of action.

*Normal level trunk calling.*—The XY switch is actually a 121-point device, comprising eleven levels of eleven points or contacts each. There is a first level which can be reached if the brushes are not moved in the X direction. Since it is possible to have only as many subscriber lines as can be reached by connectors and it is normally impossible to send a connector switch only in the Y direction under the influence of the dial, it is not practical to set up a system having 110 lines per group, and therefore, this first or normal level usually is not used, the switch stepping in the X direction before stepping in the Y direction. In the case of small exchanges, however, having only a few incoming trunks, it has been proposed to place such trunks on line terminals to avoid the use of incoming selectors. The trunks are, therefore, found when energized in exactly the same manner as subscriber lines. Such a scheme, according to previous arrangements, has the disadvantage of reducing the number of possible subscriber lines. Thus a system serving five incoming trunks would be limited to 95 subscriber lines. Provision is made in the allotter shown and described herein to make use of the normal level of the finder for incoming trunks which do not appear on connectors and, therefore, are not influenced by the inability to reach them by dialing. This is done by the addition of the normal level relay ANL to establish ground at an X-brush whenever voltage appears on a trunk start lead so that the allotter can send the finder in the Y direction without movement first in the X direction. Obviously, in the previously described operation, if the finder does not move in the X direction, the X-brush could not become grounded. Therefore, relay ANL is a substitute for the X-brush and marking terminal and operates when a special start lead for trunks is energized. It not only grounds the start lead upon operating but also simulates a condition of X marking and causes the finder switch to hunt only in the Y direction, i. e., move directly into the normal level when the allotter is energized by a trunk call. Its operation is such as always to give trunks first choice, although the circuit is arranged that once a subscriber is being hunted, the finding operation will be completed even though the normal level relay may operate during the finding process. This feature of moving only in the Y direction allows the associated selector to discriminate between calls originated by trunks against those originated by subscribers in that the X off-normal combination remains undisturbed on trunk calls and the discriminating leads 69 and 70 are closed.

The incoming trunks are connected to the normal level contacts of the tip, ring, sleeve and hunt banks of the finder switch FS*w*. The line circuit associated with the calling trunk places ground, i. e., positive battery voltage, on the trunk start lead TST (see upper portion of Fig. 12) and on the corresponding H terminal in the line finder bank. If relay AS1 has not been operated previously, a circuit is completed for the normal level relay ANL over a circuit including battery, the winding of relay ANL, armature AS1—2, contact AS1—1, contact ALB—3, armature ALB—2 to the grounded trunk start lead TST. Operation of relay ANL grounds the line start lead LST at armature ANL—7 and contact ANL—6, in order to energize relay AS—1 through contact AA—3 and armature AA—4. The operation of relay AS—1 causes the energization of relay AS—2 and relay AD as in the case of normal starting. Relay ANL locks up through its own armature ANL—4 and contact ANL—5 to the grounded trunk start lead.

In this phase of my invention, it is not necessary that the finder switch be driven in the X direction, since the switch contact brushes are already opposite the normal level. The circuit for energizing the X magnet FX is broken at contact ANL—1 and circuit connections are made to apply driving ground immediately to the Y magnet of the finder switch FS*w*. The circuit extends from battery in the finder (Fig. 4) through switch FOF—1, magnet FY, the interrupter switch of magnet FY, the Y lead from the finder to the allotter, the contact and brush of section 52 of selector switch ALS, armature AA—1, contact AA—2, contact ANL—3, armature ANL—2, contact AD—3, armature AD—4, armature AS2—6, contact AS2—5, contact AS1—4 and armature AS1—3 to ground. The finder switch hunts on a self-interrupting basis until ground is encountered on the normal level H contact corresponding to the calling trunk. Ground on the H brush operates the allotter advance relay AA to advance selector switch ALS to the next idle link as previously described in connection with the sequence of operations for a regular call. Cut-through to a connector and the party selection by dialing is accomplished as previously described for a normal call.

It may be desired to restrict certain levels of selector switch SS*w* to local subscriber's lines but to make available such levels to trunk calls. Referring to Fig. 6, the eighth level is so arranged. Thus, on a call from a local subscriber, when switch SS*w* is stepped to an unrestricted level, a circuit for energizing the cut-through relay SMT is completed as previously described to extend the T, R, S and H leads. Briefly, one terminal of the winding of relay SMT is connected to ground by way of conductor 45 (see Figs. 5 and 6), XX brush and the back sleeve lead. The other terminal of the winding of relay SMT is connected to battery through contacts SX*on*—4 and SX*on*—3, interrupter of magnet SY, winding of relay SH, and overflow contacts of SOF.

However, if the selector switch SS*w* is stepped to the eighth level on a call from a subscriber's line, as distinguished from a trunk call, the lead to the XX bank contact, corresponding to lead 4S, is not connected directly to relay SMT but by way of conductor 70, contact FX*on*—6 and armature FX*on*—5 of the off-normal switch FX*on*, and conductor 69. Hence, the circuit for energizing relay SMT on trunk calls is held open and is not completed to ground unless the finder switch FS*w* has remained in its normal position relative to its primary direction of movement, i. e., only when switch FS*w* has moved into the normal level or its secondary direction without movement in the primary direction in response to a trunk call. Referring to the line finder circuit, Fig. 4, since the finder switch has not moved in the X direction, the X off-normal contacts have not been operated. Therefore, conductors 69 and 70 between the line finder and the selector remain connected together through X off-normal armature FX*on*—5 and contact FX*on*—6 as shown, to allow normal level trunks to reach restricted selector levels of the selector step switch SS*w*.

*Changeover.*—In Fig. 17 there is illustrated a modification of the foregoing changeover circuit for transferring stepping from the X to the Y direction. Instead of using a single changeover or X-stopping relay AX in the allotter, each finder is provided with a changeover relay FCH. Fig. 17 illustrates in simplified form the line circuit of Fig. 3, the finder circuit of Fig. 4 and the allotter circuit of Figs. 11 and 12. Relays, contacts, and armatures are identified by the same numerals and letters wherever identity exists. It will be recalled that potential on a start lead causes energization of relay AS1 and then AS2. Closure of armature AS2—13 with contact AS2—14 completes a circuit for the energization of relay FCH. One side of FCH is grounded. The other side extends to battery through lead XB, contact and brush of section 58 of switch ALS, armature AS2—13, contact AS2—14 and coil of relay AX. The resistances of the series connected relays is such that only relay FCH picks up to open up the circuit for magnet FY at armature FCH—1 and contact FCH—2. Relay AD picks up over a circuit including armature AS2—6, contact AS2—5, contact AS1—4 and armature AS1—3. Switch FS*w* steps over a driving circuit extending from the upper side of FX, as viewed in Fig. 17, through the interrupter switch of magnet FX, X lead, section 51 of switch ALS, contact AX—5, armature AX—4, contact ANL—1, armature ANL—2, contact AD—3, armature AD—4, armature AS2—6, contact AS2—5, contact AS1—4, and armature AS1—3 to ground. The other side of FX extends to battery through the overflow switch FOF. When the switch FS*w* reaches the marked line, relay AX is energized over the XB lead. Relay FCH is short circuited and released. Operation of relay AX interrupts the X-driving circuit and completes a driving circuit for magnet FY.

*Unsuccessful busy test.*—If a connector has seized a calling line circuit before the line finder has reached the calling line, ground is present on the forward or front sleeve lead and cut-through ground from the allotter cannot operate the cut-through relay FCT because both sides of the winding of relay FCT are grounded.

*Overflow recycling.*—When the finder step switch fails to find a marked line, as if the calling party hangs up before the calling line was found, or if the marking lead is open, or, in the case of a faulty line, for example, and the switch goes to the 11th step in either the X or the Y direction, the overflow switch FOF is operated, thereby removing battery from the stepping magnet. Overflow contacts FOF—2 place ground on the H brush of the finder switch FS*w* to simulate finding and to cause the allotter to advance. The circuit for the latter operation extends from ground at FOF—2 over the HB lead through contact and brush 57 of selector switch ALS, armature AA—7, contact AA—8, winding of relay AA to battery. The advance of the allotter releases relays SC and SD. Release of relay SD completes a circuit for operating release relay FZ at contact SD—9 and armature SD—10. The switch then restores due to the action of release relay FZ.

Similarly in the selector and connector, if for any reason the step switch reaches the overflow position, the overflow switches corresponding to that switch operate to open the energizing circuits for the step magnets. Operation of the selector overflow switch causes the transmission of busy tone and flash, to the calling line the circuit extending from the busy tone and flash lead BBTF in the selector through contacts SOF—5 and SOF—3, contact SMT—13 and armature SMT—11 to the back ring conductor to the finder, contact FCT—11 and armature FCT—10 and the back ring conductor to the ring brush in the finder switch FS*w*.

*Timed recycling.*—As indicated above, means is provided to advance the allotter if the calling line is not found or if the step switch is not operating. When relay AS1 operates in response to a calling condition on start lead LST, a path is prepared over which pulses of ground are fed from the pickup lead OPU to operate the permanent time relay APT, the circuit extending from the pickup lead OPU (see Fig. 11) through armature AS1—5, contact AS1—6, armature APT—3, contact APT—4, winding of relay APT to battery. Relay APT locks to ground over a circuit extending from battery, through the winding of relay APT, contact APT—4, contact APT—5, contact AS2—8 and AS2—7 to ground.

Operation of relay APT also prepares a path over which ground pulses from the cancel lead CA—1 can be applied to the allotter advance relay AA, the circuit extending from lead CA—1, for example, through armature APT—7, contact APT—6 to the winding of relay AA. If the calling line is not found by the time the common timing equipment furnishes pickup and cancel pulses, relays APT and AA are energized to step selector switch ALS, thus allotting another finder which will function to find the calling line.

*Peg count.*—In order to provide an indication that a finder switch has reached some X level, a pulse of ground is transmitted over the peg count lead PC each time the X stopping relay AX operates. The circuit comprises lead PC, contact AX—5, armature AX—4, contact ANL—1, armature ANL—2, contact AD—3, armature AD—4, armature AS2—6, contact AS2—5, contact AS1—4 and armature AS1—3 to ground.

*Selector*

*Permanent time release.*—In order to dismiss a selector under line fault conditions, ground is supplied at intervals to the selector permanent timing relay SPT over the office pickup lead OPU through armature SPT—1, contact SPT—2, contact SD—14, armature SD—15, winding of relay SPT to battery. Relay SPT locks up to master ground through contacts SPT—2 and SPT—3. Operation of relay SPT substitutes a holding ground received over the office hold lead OH through contacts SPT—5 and SPT—6 for the ground furnished to the sleeve lead through contact SPT—5 and armature SPT—4. After a predetermined time, the hold lead OH is opened (see Fig. 14) and the circuit dismissed because of the removal of ground from the back sleeve lead. In order to energize the timing equipment, ground is supplied to the BRS lead by closure of contact SD—8, armature SD—7, contact SMT—1 and armature SMT—2.

*Digit adding.*—When the selector is equipped for digit adding, as shown in Fig. 6, the selector returns to its normal position the first time a pre-determined digit is dialed, but hunts normally thereafter. When an XX level equipped for digit adding by utilization of the equipment within rectangle D of Fig. 6 and wiring "M" is dialed, ground appears on the XX brush from the back sleeve lead, the circuit extending from the back sleeve lead through contact SXD—10 and armature SXD—9 to the auxiliary XX brush. Ground on the XX brush operates the drop back relay SDB over a circuit extending from ground at the XX brush, contact in the XX bank, armature SDB—7, contact SDB—6, winding of relay SDB to battery. Relay SDB locks to sleeve ground through contacts SDB—6 and SDB—5. The operating path for the Y magnet SY is opened at contact SDB—1 and armature SDB—2 and the path carrying dial tone to the calling station is opened at contact SDB—11 and armature SDB—10. The release magnet SZ is operated upon the closure of armature SDB—4 with contact SDB—3, through contact SAB—6 and armature SAB—7. The stepping switch SS*w* returns to normal. The return of the switch to normal restores the off-normal switches to complete a path for the energization of relay SAB, over a circuit extending from the winding of relay SAB through contact SAB—9, armature SAB—8, contact SDB—8, armature SDB—9, off-normal contact SX*on*—1 and armature SX*on*—2 to master ground. The XX brush is no longer effective to return switch SS*w* to normal because the release circuit is broken at armature SAB—7.

Thereafter, the call proceeds in the normal manner. After the switch steps in the X-direction, the Y magnet is operated over a path completed through armature SAB—4 and contact SAB—5.

*Digit cancelling.*—If it is desired to provide digit cancelling or absorbing on one or more levels, ground on the XX brush of the selector switch is conducted over the digit absorbing conductor and through the off-normal switches in shunt to the winding of release magnet SZ in order to return the switch to its home position each time that particular digit is dialed.

*Dead levels.*—Means is provided whereby the selector does not cut through on dead levels and a distinctive tone may be returned to the calling subscriber to indicate that a dead level has been dialed. It will be recalled from the description of selector operation that relay SMT is shunted during hunting over busy terminals of switch SS*w*, one connection to ground being made through the XX brush and bank. On dead levels, there is no connection made into the XX level of switch SS*w* and hence the side of relay SMT extending to the XX bank of switch SS*w* is open and SMT cannot operate as long as the auxiliary or XX brush stands at a dead level. After the switch SS*w* takes one step in the Y direction, the ground for energizing relay SH to step magnet SY is absent and hence switch SS*w* halts on the first terminal or bank in the Y direction. Thus, there is provided means for halting or limiting the movement of the tip, ring, sleeve and hunt brushes at a predetermined position of the secondary or Y movement when the primary or X movement is positioned at a dead level. If a dead level is dialed, the de-energization of relay SXD after dialing ceases, completes a circuit for carrying a dead level tone back to the calling subscriber over the ring lead, the circuit extending from a suitable source of tone (not shown), the dead level tone lead (Fig. 6), terminal in X bank of switch SS*w*, X brush, contact SXD—1, armature SXD—2, condenser 73, overflow switch SOF, contact SMT—13 and armature SMT—11 of relay SMT to the back ring lead.

*Connector*

*Conversation timing.*—Upon answering by the called subscriber, and consequent operation of relay CRT, as explained under the heading "Ringing trip," the conversation timing start lead BCTS is grounded over a circuit extending from battery at the conversation timing start relay BCTS (Fig. 14), winding of relay BCTS, BCTS lead, contact CRT—7, armature CRT—6, contact CD—5 and armature CD—4 to ground. Relay BCTS is energized to ground the office timing start lead OTS by engagement of armature BCTS—1 with contact BCTS—2 and thereby bring into operation suitable timing means, as a pulse generator of desired type, for example. Operation of relay BCTS also completes the office timing pulse lead OTP from the timing means, not shown, by the engagement of armature BCTS—3 and contact BCTS—4 to the winding of timing pulse relay BTP—1 and also to the winding of timing pulse relay BTP—2. The timing pulse relays operate on each pulse. Individual contacts are provided for each line finder or connector, or both, and individual timing pulse ground is applied to the XX bank terminals representing the timed levels. This circuit is released when all CRT relays are de-energized.

Referring particularly to the connector, means is provided for dismissing the connections or completed circuit after receipt of a predetermined number of timing pulses. When the ringing trip relay CRT is operated, the minor switch CS is released by ground originating at the busy test relay CBT and following a path through armature CBT—1, contact CBT—2, armature CRT—4, contact CRT—5, off-normal switch CS—2 of minor switch CS and the release coil CS*b* to battery. Upon the return of switch CS to normal, off-normal relay CON is de-energized by the opening of the circuit including off-normal switch CS—1. The release of relay CON causes the energization of relay CBT over a circuit extending from battery through the lower winding of relay CBT, armature CA—13, contact CA—14, contact CON—8, armature CON—7, armature CSD—5 and contact CSD—6 to ground. The purpose of re-operating relay CBT is explained in the last paragraph under the heading "Conversation timing."

The circuit for the minor switch release magnet is thereby opened to permit the re-stepping of switch CS by timing pulses, if any, brought indirectly into the connector from the line finder over the H conductor or directly from the XX bank of the connector.

Operation of the answering relay CA completes a path for the timing pulses to step switch CS as follows: H lead, armature CA—1, contact CA—2, armature CBT—4, contact CBT—5, ballast lamp 82 and rotary magnet winding CSa to battery. When conversation timing is furnished, wiring "V" is used instead of wiring "W" in order to insert ballast lamp 82. Ballast lamp 82 is provided to limit the current flowing in the last-mentioned circuit and prevents overheating of winding CSa. The ballast lamp preferably has a thermal coefficient of resistance such that operating pulses pass through before its resistance arises appreciably but the hot resistance is current limiting. Thus the ballast lamp permits pulses of relatively high currents to pass through winding CSa to operate the switch and thereafter serves to reduce the current to a safe value. Switch CS advances each time a timing pulse is received. With the arrangement shown in Fig. 9 on the seventh switch point, which means that seven timing pulses have been received, a warning tone is fed to the ring conductor or lead over a circuit extending from the conversation warning tone lead OCWT (Fig. 8) through armature CBT—6, contact CBT—7, brush and contact of the C section of switch CS, contact CRT—20, armature CRT—22, tone condenser 83, contact CCT—9, armature CCT—10, contact CON—2, armature CON—1, contact CSD—2 and armature CSD—1 to the back ring lead R. When the minor switch steps to the ninth position, another warning tone is furnished over substantially the same path since contacts 7 and 9 are wired together. When the switch CS reaches the tenth position, the grounded tone lead OCWT, which is connected to the brush of section C of switch CS through armature CBT—6 and contact CBT—7, is applied to the tenth contact, and through contact CRT—9 and armature CRT—11 to the winding of relay CSD which operates for the second time during the call, in order to dismiss the call by removing both front and back sleeve grounds at contact CSD—18 and armature CSD—17. The finder and the selector, which have been held by sleeve ground, are dropped and lock out, if provided in the line circuit, is established. It may be observed that at the time of the first operation of relay CSD, a shunt was provided around armature CSD—17 and contact CSD—18 through contact CRT—19 and armature CRT—18.

*Time cancelling.*—If one of the levels is provided with time cancelling provisions, direct ground is connected to the corresponding contact in the XX bank in order to hold magnet CSa of step switch CS permanently energized to prevent further stepping and, therefore, prevent the reception of timing pulses whereby the circuit cannot be dismissed by timing. Ballast lamp 82 limits the sustaining current.

*Trunk hunting.*—If trunk hunting is desired, the equipment shown within the dashed rectangle F of Figs. 8 and 9 is included and the wiring indicated by the letter "C" is used, it being understood that if the trunk hunting feature is not employed, relays CTH and CPA are not provided and wiring "D" is used. With the provision of trunk hunting, the connector can choose an idle line out of several in a group, such as trunks to a P. B. X station. The hunt terminals of all but the last trunk in the connector multiple are marked by resistance battery and the last contact or trunk is marked by direct ground.

The first trunk is selected by dialing. When the H brush of the connector switch CSw passes a marked terminal or trunk, the trunk hunting relay CTH is energized. The left-hand terminal of the upper winding of relay CTH, as viewed in the drawing, is connected to ground through contact CD—13 and armature CD—14. The other terminal of the upper winding of relay CTH is connected to the hunt brush through contact CCT—12 and armature CCT—13. Relay CTH releases when the hunt brush moves to the next terminal. If the connector switch stops on a marked trunk, and this trunk is found busy, relay CBT operates from sleeve ground through contact CYD—7 and contact CYD—6. The subsequent release of relay CYD completes a path from master ground to re-energize relay CXD, the circuit extending from battery through the lower winding of relay CXD, as shown in the drawings, contact CYD—13, armature CYD—14, contact CBT—15, armature CBT—16, contact CTH—9 and armature CTH—10, to master ground. The second operation of relay CXD re-operates relay CYD from master ground at armature CXD—1 through contact CXD—2 and the lower winding of relay CYD to battery. The previous release of relay CYD caused the energization of relay CSD, which is arranged to be subsequently independent of the further action of relay CYD as previously explained. Hence, the pulsing paths to both stepping magnets CX and CY are opened at contact CSD—16 and armature CSD—14 and the pulsing path to stepping magnet CSa is closed at armature CSD—14 and contacts CSD—15. Therefore, the calling party can dial the third connection digit while trunk hunting is going on.

The energization of relays CBT, CTH, CXD and CYD establishes the necessary conditions for trunk hunting. Pulse assist relay CPA is next energized. One side of the winding of relay CPA is connected to battery and the other side is connected to ground over a circuit including the interrupter switch CY—1, contact CTH—6, armature CTH—5, contact CBT—3 and armature CBT—1. Relay CPA transmits pulses through the winding of magnet CY over a circuit extending from ground at contact CPA—2 through armature CPA—1, armature CYD—12, contact CYD—11, contact CXD—9, armature CXD—8, upper winding of relay CYD, magnet winding CY and overflow contacts COF to battery. The connector step switch CSw steps in the Y direction. The busy ground previously described is broken as the switch moves forward but relay CBT is held operated by a second ground extending through contact CPA—4, armature CPA—3, and lower winding of relay CBT to battery, so that relay CBT remains steadily operated as long as busy sleeve contacts are encountered.

If an idle trunk is reached, relay CBT releases because of the lack of sleeve ground. Release of relay CBT opens the holding path for relay CXD at armature CBT—16 and contact CBT—15, which releases relay CXD and this relay in turn effects the release of relay CYD at armature CXD—1 and contacts CXD—2, and also opens the energizing path for relay CPA at armature CBT—1 and contact CBT—3. The release of relays CXD and CYD prevents further hunting.

The release of relay CYD connects relay CCT to sleeve ground for the second busy test.

When relay CTH was energized previously, a path was established from the lower winding of relay CTH to battery at one terminal and to resistance battery over a circuit including contact CTH—8, armature CTH—7, contact CXD—10, armature CXD—11, contact CCT—12 and armature CCT—13 to the H brush, thereby locking up relay CTH. As indicated by the arrows adjacent the windings of relay CTH, the windings of this relay are arranged so that the flux normally developed therein opposes, although the ampere turns relationship is made sufficient to hold the relay operated by means of its upper winding.

If there are no idle trunks, the connector steps to the last trunk which is marked with direct ground on its H terminal, thereby grounding the right hand terminal of the upper winding of relay CTH, effectively shunting this winding. The lower winding is fully energized so that flux reversal takes place, i. e., the flux in the upper winding is no longer effective and that in the lower winding becomes controlling. Hence, relay CTH releases immediately to stop hunting by the switch. Relay CBT is held up to sleeve ground until the release of relays CXD and CYD since their paths are opened by relay CTH. The release of relay CYD permanently locks relay CBT to ground through armature CD—11 and contact CD—12 and contact CYD—6 and armature CYD—5, and busy tone and flash is applied to the calling line. Relay CBT holds up during release of relay CYD because armature CYD—5 engages contact CYD—6 before the latter breaks from contact CYD—7. At this point it is noted that relay CTH held the busy tone and flash lead OBTF open in order to avoid a false indication to a subscriber during the hunting operation.

*Permanent time release.*—When the calling relay CC is operated, but before the answering relay CA is energized, a path is established to the permanent timing relay CPT from the common timing equipment. This circuit extends from pickup lead OPU through armature CPT—5, contact CPT—6, contact CA—9, armature CA—10, contact CD—10, armature CD—9 and winding of relay CPT to battery. Pulses of ground received over the pickup lead operate relay CPT which locks to ground at contacts CPT—4 and CPT—6. The ground previously furnished for stepping the connector switch CS*w* and for energizing master ground at armature CPT—1 is transferred to the office hold lead OH at contacts CPT—2 and CPT—3. At the end of the timing out period, holding ground is removed for a pre-determined time, one second for example, which results in the release of the connector relays and the establishment of lock out. As soon as relays CD and CPT release, the release magnet CZ is energized to restore the step switch CS*w* to normal, the circuit extending from one side of magnet winding CZ to battery and from the other side to ground through the paralleled X and Y off-normal contacts, contact CD—7, armature CD—6, contact CC—4, armature CC—3, contact CPT—2 and armature CPT—1.

Relay CPT is released by the operation of relay CA at contact CA—9 and armature CA—10. Release of the connector is thus effected only by conversation timing or by the release of the calling relay CC. The permanent timing circuit is reinstated at any time by the release of relay CA.

*Common timing equipment*

*Permanent alarm.*—There are illustrated in the selector and connector circuits permanent timing relays SPT and CPT, respectively. If these relays are omitted, permanent alarm equipment may be provided in the common equipment as shown in Fig. 14. In this case, referring to the selector, the dashed rectangle C is substituted for the apparatus illustrated in the dashed rectangle B. Upon the seizure of a selector or a connector, the bay ringing and tone start lead BRS is grounded, thereby completing a circuit for energizing relay BTS over a circuit extending from battery at one terminal of the winding through the winding of relay BTS, the lead BRS, contact SD—8, armature SD—7, contact SMT—1 and armature SMT—2 to ground. The office ringing and tone start lead ORS is grounded by the engagement of armature BTS—1 with contact BTS—2 to energize the ringing and tone start equipment, not shown.

Energization of relay BTS also prepares a circuit for the energization of relay BPT over a circuit extending from battery through the winding of relay BPT, contact BTS—4, armature BTS—3, contact BPT—7, armature BPT—8, contact BALM—1 and armature BALM—2 of the bay alarm relay BALM and the OPU lead. This circuit causes relay BPT to operate in response to pulses received over lead OPU. Relay BPT locks up to the hold lead OH at contacts BPT—7 and BPT—6 and operates relay BALM over a circuit extending from ground at armature BPT—4 through contact BPT—5, armature BALM—8, contact BALM—7 and winding of relay BALM to battery. Relay BALM locks up over a circuit extending from its winding through contact BALM—9, contact BALM—7 to lead BRS. When the hold lead OH is opened by the engagement of the brush of interrupter 72, with the insulated segment for example, relay BPT releases, thereby grounding the office permanent alarm lead OPA through armature BPT—1, armature BPT—2, armature BALM—3 and contact BALM—4.

*Allotter time out.*—The operation of any line relay applies resistance ground to the allotter start relay AS—1 as previously described. The operation of relay AS—1 caused ground to be placed on the cancel start lead CAS—1 at armature AS1—3, through contact AS1—4 and lead CAS—1 to energize one winding of cancel start relay BCAS (Fig. 14) depending upon which half of the dual allotter is energized by a start lead involved. Relay BCAS operates to ground the office ringing and tone start lead ORS through armature BCAS—3 and contact BCAS—4 to start the operation of a pulse generator (not shown). The pulses from the generator are received over the office allotter timing lead OAT and energize relay BCAP through armature BCAS—1 and BCAS—2. The pulses are repeated by relay BCAP and returned to the allotter over one of the cancel leads CA1 or CA2 dependent upon which half of the allotter is involved. Inasmuch as each cancel lead is connected to one terminal of the winding of allotter advance relay AA through armature APT—7 and contact APT—6, the appearance of ground on the cancel lead results in the energization of relay AA and the recycling of the allotter.

What I claim is:

1. A telephone system comprising a plurality of subscribers' lines, a plurality of calling lines, said calling lines being divided into two classes, a two-direction step switch having a plurality of bank contact levels, a contact brush set normally positioned opposite one of said levels, lines of one of said classes terminating in said one level, lines of the other class terminating in the remaining levels, means responsive to a calling condition on lines of said other class for causing said brush set to move to a position opposite and then into one of said remaining levels in response to a call on one of the lines of said other class, and means responsive only to a calling condition on lines of said one class for causing said brush set to move directly into said one level in response to a call on one of the lines of said one class, the last-mentioned means comprising a relay and means whereby said relay is energized responsive to a calling condition on a line of said one class to disable said first-mentioned means and to cause said switch to move only into said one level.

2. A telephone system comprising a plurality of subscribers' lines, a plurality of trunks, a two-direction step switch having a plurality of bank contact levels, a contact brush set normally positioned opposite one of said levels, said trunks terminating in said one level, said subscribers' lines terminating in the remaining levels, a primary driving circuit for causing said brush set to move in a primary direction to a position opposite to one of said remaining levels and a secondary driving circuit for causing said brush set to move in a secondary direction into said one of said remaining levels in response to a call on one of said subscribers' lines, a relay, said relay having normally closed contacts in said primary driving circuit and means whereby said relay is caused to be energized in response to a trunk call in order to open the primary driving circuit for said brush set whereby said brush set moves only in said direction in response to trunk calls.

3. A telephone system comprising a plurality of subscribers' lines, a plurality of trunks, a two direction step switch having a plurality of bank contact levels, a contact brush set normally positioned opposite one level, said trunks terminating in said one level, said subscribers' lines terminating in the remaining levels, means for moving said brush set in a primary direction to a position opposite to and then in a secondary direction into one of said remaining levels in response to a call on one of said subscribers' lines and means for moving said brush set directly into said one level in response to a call on one of said trunks, the last-mentioned means comprising a relay, means whereby said relay is caused to be energized only in response to trunk calls, a first circuit for causing said switch to move in said primary direction and a second circuit for causing said switch to move in said secondary direction, said relay having a normally closed contact in said first circuit and a normally open contact in said second circuit whereby said first circuit is rendered ineffective to cause said switch to move in said primary direction in response to a calling condition on one of said trunks and said second circuit is completed for moving said switch into said one level without first moving in said primary direction.

4. A telephone system comprising a plurality of calling lines of a first class, a plurality of calling lines of a second class, a two direction step switch having a plurality of bank contact levels, a contact brush set normally positioned opposite one level, said lines of said second class terminating in said one level, said lines of said first class terminating in the remaining levels, means for moving said brush set in a primary direction to a position opposite to and then in a secondary direction into one of said remaining levels in response to a call on one of said lines of said first class, means for moving said brush set directly into said one level in response to a call on one of said lines of said second class, said switch having off-normal contacts operated in response to the primary movement means and arranged to be circuit closing in the normal position of said step switch and circuit opening whenever said step switch is moved away from normal in the primary direction, and means utilizing said off-normal contacts for providing trunk call identification to any succeeding step switches.

5. A telephone system comprising a plurality of subscribers' lines, a plurality of trunks, a two-direction finder step switch having a plurality of bank contact levels, a contact brush set normally positioned opposite one level, said trunks terminating in said one level, said subscribers' lines terminating in the remaining levels, means for moving said brush set in a primary direction to a position opposite to and then in a secondary direction into one of said remaining levels in response to a call on one of said subscribers' lines, means for moving said brush set directly into said one level in response to a call on one of said trunks, said switch having off-normal contacts operated in response to the primary movement means and arranged to be circuit closing in the normal position of said step switch and circuit opening whenever said step switch is moved away from normal, additional means for extending a call beyond said finder switch, said means including a switch and a cut through relay, a circuit for energizing said relay, means for completing said energizing circuit when said additional switch steps to an idle line of an unrestricted level thereof, means for holding open said energizing circuit when said additional switch steps to levels restricted with respect to subscribers' lines, and means for completing said energizing circuit when said additional switch steps to said restricted level at such times as said finder switch moves only in its secondary direction in response to a trunk call, the last-mentioned means comprising a circuit including said off-normal contacts.

6. In a telephone system, a plurality of calling subscribers' lines; a plurality of calling trunk lines; a called line; means including a switch train for extending a call from a calling line to said called line; said extending means including a two-direction finder step switch having a plurality of bank contact levels, a contact brush set normally positioned opposite one of said levels, said trunks terminating in said one level, said subscribers' lines terminating in the remaining levels, means for moving said brush set in a primary direction to a position opposite to and then in a secondary direction into one of said remaining levels in response to a call on one of said subscribers' lines, means for moving said brush set directly into said one level in response to a call on one of said trunks, said switch having off-normal contacts operated in response to the primary movement means and arranged to be circuit closing in the normal position of said step switch and circuit opening whenever said step switch is moved away from normal; said extending means also including a directively operated selector step switch having a plurality of bank contact levels and a contact brush set; a cut through relay for extending said calling line from said finder switch brush set to said selector switch brush set; a first circuit for energizing said relay through certain levels of said selector switch; a second circuit for energizing said relay through another level of said selector switch; said second circuit including said off-normal contacts; whereby trunk calls are extended to said selector when said finder switch moves in said secondary direction without first moving in said primary direction and subscribers' calls are extended to said selector when the said finder switch moves in both primary and secondary directions.

7. In a telephone system, a plurality of subscribers' lines, a plurality of finder-selector links for finding a calling subscriber's line, means for allotting one of said links to each call, each finder and each selector including a step-by-step switch, each switch having a normally closed off-normal contact corresponding to movement in each direction and which is caused to open by movement of said switch in its said respective directions, means for releasing said switches to their normal positions after a stepping operation, said releasing means including a contact which is closed during the stepping of said switch, and means for testing for an idle link, the last-mentioned means comprising a step switch having a movable brush and a plurality of bank contacts for testing the idle condition of said links, each bank contact being connected to a different link, and a series circuit including said movable brush and a contact of said step switch, a source of potential, a relay, the selector and finder release contacts and the selector and finder off-normal contacts of the link being tested, and means for causing movement of said brush successively to engage said bank contacts whereby said relay is energized whenever said brush engages a bank contact corresponding to an idle link.

8. A telephone system comprising a two-direction step-by-step switch having a plurality of bank contact levels, contacts in certain of said levels being connected to succeeding equipment, at least one of said levels being a dead level, said switch having a first set of contact brushes, means for directively controlling said set of brushes to move in a primary direction to a position opposite one of said levels, an auxiliary contact brush set, means for moving said auxiliary set only in accordance with the primary position of said first brush set, means for causing said first set of brushes to hunt in said one level for an idle connection to succeeding equipment, and means whereby said auxiliary set is utilized to halt hunting of said first brush set at a predetermined position in said secondary direction when said brush set is positioned opposite a dead level.

9. A telephone system comprising a two-direction step-by-step switch having a plurality of bank contact levels, contacts in certain of said levels being connected to succeeding equipment, at least one of said levels being a dead level, said switch having a first set of contact brushes, means for directively controlling said set of brushes to move in a primary direction to a position opposite one of said levels, an auxiliary contact brush set, means for moving said auxiliary set only in accordance with the primary position of said first brush set, means for causing said first set of brushes to hunt in said one level for an idle connection to succeeding equipment, and means whereby said auxiliary set is utilized to restrict hunting of said first brush set when said brush set is positioned opposite a dead level.

10. In combination with a switching device having a set of contact brushes positioned responsive to a primary stepping movement and a secondary stepping movement, and an auxiliary contact brush positioned only according to said primary stepping movement, means utilizing said auxiliary brush for limiting the secondary stepping movement whenever said primary stepping movement is positioned at a dead level.

11. In a telephone system comprising at least one calling station a plurality of groups of called stations, at least one connector for each of said groups for completing calls to stations of the assigned group, and at least one selector for cutting through a calling station to a connector assigned to a group including a desired called station, said selector comprising a directively operated switching device having a set of contact brushes positioned responsive to a primary stepping movement for selecting a group of connectors assigned to the group of called stations including said desired called station and to a secondary stepping movement to select an idle one of said group, a relay, a circuit whereby said relay is energized, for cutting through the calling line to an idle connector, and means for preventing operation of said relay and limiting secondary movement of said switching device if said primary stepping movement comes to rest at a dead level.

12. In a telephone system comprising at least one calling station, a plurality of groups of called stations, at least one connector for each of said groups for completing calls to stations of the assigned group, and at least one selector for cutting through a calling station to a connector assigned to a desired called station, said selector comprising a directively operated switching device having a set of contact brushes positioned responsive to a primary stepping movement for selecting a group of connectors assigned to the group of called stations including said desired called station and to a secondary stepping movement to select an idle one of said group, a relay a circuit whereby said relay is energized for cutting through the calling line to an idle connector, and means for limiting the secondary movement of said switching device if said primary stepping movement comes to rest at a dead level.

13. In a telephone system comprising at least one calling station, a plurality of groups of called stations, at least one connector for each of said groups, and at least one selector for cutting through a calling station to a connector assigned to a desired called station, said selector comprising a directively operated switching device having a set of contact brushes positioned responsive to a primary stepping movement for selecting a group of connectors assigned to the group of called stations including said desired called station and to a secondary stepping movement to select an idle one of said group, a relay a circuit whereby said relay is energized for cutting through the calling line to an idle connector, a pulse assist relay cooperating with said switching device to produce the secondary movement thereof, and means responsive to said primary movement halting at a dead level for preventing operation of said pulse assist relay and said switching device in the secondary direction.

14. In a telephone system, a calling line, a finder circuit including a step-by-step switch for finding said calling line, a called line, a connector circuit including a step-by-step switch for completing a connection from said calling line to said called line, each of said switches comprising a set of contact brushes positioned responsive to stepping movement, said finder and said connector switches each having an auxiliary contact brush positioned according to the position of said brushes, a source of timing pulses, means utilizing the connector auxiliary brush for conducting timing pulses from said source directly to said connector circuit and means utilizing the finder auxiliary brush for conducting timing pulses from said source indirectly to said connector circuit through said finder switch.

15. In a telephone system, a calling line, a finder circuit for finding said calling line, a called line, a connector circuit for completing a connection from said calling line to said called line, each circuit including a two motion switch, each switch comprising a set of contact brushes positioned responsive to a primary stepping movement and a secondary stepping movement, said finder and said connector switches each having an auxiliary contact brush positioned according to said primary stepping movement, a source of timing pulses, means utilizing said finder and said connector auxiliary brushes for respectively conducting timing pulses directly to said connector circuit and indirectly to said connector circuit through said finder switch, and means for dismissing the completed circuit after receipt of a predetermined number of said pulses.

16. In a telephone system, a calling line, a finder circuit for finding said calling line, a called line, a connector circuit for completing a connection from said calling line to said called line, each circuit including a two motion switch, each switch comprising a set of contact brushes positioned responsive to a primary stepping movement and a secondary stepping movement, said finder and said connector switches each having an auxiliary contact brush positioned according to said primary stepping movement, a source of timing pulses, means utilizing said finder and said connector auxiliary brushes for respectively conducting timing pulses directly to said connector circuit and indirectly to said connector circuit through said finder switch, and means for dismissing the completed circuit after receipt of a predetermined number of said pulses, the last mentioned means comprising a step switch, and means whereby said step switch is caused to advance one step upon receipt of each timing pulse and circuit means associated with a predetermined one of said steps.

17. In a telephone system, a calling line, a finder circuit for finding said calling line, a called line, a connector circuit for completing a connection from said calling line to said called line, each circuit including a two motion switch, each switch comprising a set of contact brushes positioned responsive to a primary stepping movement and a secondary stepping movement, said finder and said connector switches each having an auxiliary contact brush positioned according to said primary stepping movement respectively, a source of timing pulses, means utilizing said finder and said connector auxiliary brushes for respectively conducting timing pulses directly to said connector circuit and indirectly to said connector circuit through said finder switch, a step switch, means whereby said step switch is caused to advance one step upon receipt of each timing pulse, and a source of warning tone, means whereby said warning tone is applied to the completed connection when said step switch reaches a predetermined step, whereby the parties utilizing the talking circuit are apprised of the passage of a predetermined amount of conversation time, and means responsive to said step switch reaching another step of said step switch for dismissing the completed circuit.

18. In a telephone system, plurality of lines, a finder circuit for finding a calling one of said lines, a connector circuit for completing a connection from said calling line to a called line, each circuit including a two motion switch, each switch comprising a set of contact brushes positioned responsive to a primary stepping movement and a secondary stepping movement, said finder and said connector switches each having an auxiliary contact brush positioned according to said primary stepping movement, a source of timing pulses, means utilizing said finder and said connector auxiliary brushes for respectively conducting timing pulses directly to said connector circuit and indirectly to said connector circuit through said finder switch, means for dismissing the completed circuit after receipt of a predetermined number of said pulses, and means effective on calls to or from certain of said lines for rendering ineffective said timing means.

19. In a telephone system, a plurality of lines, a finder circuit for finding a calling one of said lines, a connector circuit for completing a connection from said calling line to a called line, each circuit including a two motion switch, each switch comprising a set of contact brushes positioned responsive to a primary stepping movement and a secondary stepping movement, said finder and said connector switches each having an auxiliary contact brush positioned according to the position of said primary stepping movement, a source of timing pulses, means utilizing said finder and said connector auxiliary brushes for respectively conducting timing pulses directly to said connector circuit and indirectly to said connector circuit through said finder switch, means for dismissing the completed circuit after receipt of a predetermined number of said pulses, the last mentioned means comprising a step switch, circuit means effective on completion of a call to or from certain lines for connecting said source of pulses to said step switch whereby said step switch advances one step upon receipt of each timing pulse, a source of potential, and circuit means effective on completion of a call to or from certain other lines for connecting said source of potential to said switch whereby said step switch is prevented from advancing to time the completed connection.

20. In a telephone system, a plurality of lines, a finder circuit for finding a calling one of said lines, a connector circuit for completing a connection from said calling line to a called line, each circuit including a two motion switch, each switch comprising a set of contact brushes adapted to be positioned responsive to a primary stepping movement and a secondary stepping movement, said finder and said connector switches each having an auxiliary contact brush adapted to be positioned according to said primary stepping movement, means for timing the conversation period on certain of said lines, the remaining lines being entitled to unlimited conversation time, a source of potential, a step switch, a periodically operated switch circuit for connecting said step switch through at least one of said auxiliary switches to said source of potential through said periodically operated switch whereby said step switch is caused to advance to time the completed connection, means for dismissing the completed connection after a predetermined number of steps of said step switch, and additional circuit means for connecting said step switch directly to said source of potential through said one of said auxiliary switches when the completed connection includes a line entitled to unlimited conversation time.

21. In a telephone system; a calling line; a called line; a series-connected ringing circuit comprising a relay shunted by a condenser having low impedance at the ringing frequency, a source of alternating current of a desired ringing frequency, a superimposed source of direct current, and said called line; means for maintaining said ringing circuit open with respect to direct current during the ringing period whereby operation of said relay from direct current is prevented but closed with respect to alternating current, said alternating ringing current being effective to cause ringing of the called line, and means responsive to the answering of a call for completing said ringing circuit with respect to direct current, said relay being energized by said direct current to disconnect or trip said ringing circuit when the called party answers.

22. In a telephone system; a calling line; a called line; ringing mechanism connected to said called line; a series-connected ringing circuit comprising a relay shunted by a condenser having low impedance at the ringing frequency, a source of alternating ringing current of a desired ringing frequency, a source of direct current, and said called line; means for completing said circuit only for ringing current through said ringing mechanism when said called line is inactive whereby said alternating current is effective to cause ringing of the called line, and means responsive to the answering of a call for completing said circuit for direct current to operate said relay to disconnect said ringing circuit from said called line, and means responsive to the operation of said relay for completing the extension of the calling line to the called line.

23. A telephone system comprising a calling line including an impulse transmitter, a called line, means for extending a call from said calling line to said called line, a directively operated switch, a relay, means for energizing said relay preparatory to the receipt of impulses corresponding to the transmission of a ringing digit, means for maintaining operated said relay during receipt of said pulses, means responsive to the receipt of impulses of said ringing digit for advancing said switch to a position determined by the number of impulses in said ringing digit, a source of ringing current, means for applying said ringing current in accordance with the position of said switch to said called line after extension of a calling line thereto, means responsive to the termination of said ringing digit for releasing said relay, means responsive to the answering of the call for causing said switch to return to its home position, a source of timing pulses, means utilizing said timing pulses for reoperating said switch to time the duration of the conversation period, and means effective at the end of the timing period for reoperating said relay to dismiss the call.

24. A telephone system comprising a calling line including an impulse transmitter, a called line, means for extending a call from said calling line to said called line, a directively operated switch, a relay, means for energizing said relay preparatory to the receipt of impulses corresponding to a ringing digit, means for maintaining operated said relay during receipt of said pulses, means responsive to the receipt of impulses of said ringing digit for advancing said switch to a position determined by the number of impulses in said ringing digit, a source of ringing current, means for applying said ringing current in accordance with the position of said switch to said called line after extension of a calling line thereto, means responsive to the termination of said ringing digit for releasing said relay, means responsive to the answering of the call for causing said switch to return to its home position, a source of timing pulses, means utilizing said timing pulses for reoperating said switch to time the duration of the conversation period, and means effective after receipt of a pre-determined number of timing pulses for reoperating said relay to dismiss the call.

25. A telephone system comprising a calling line including an impulse transmitter, a called line, said line including tip, ring, and sleeve conductors, means for extending a call from said calling line to said called line, a directively operated switch, a relay, means for energizing said relay preparatory to the receipt of pulses corresponding to a ringing digit, means responsive to the pulses of said ringing digit to advance said switch for applying ringing signals to said called line after extension of a calling line thereto, means for maintaining operated said relay during receipt of said pulses, means responsive to the answering of the call for causing said switch to return to its home position, means responsive to the termination of said ringing digit for releasing said relay, a source of potential, means effective upon the release of said relay for connecting said potential to said sleeve conductor to hold the extended connection after the call is answered, a source of timing pulses, means utilizing said timing pulses for reoperating said switch to time the duration of the conversation, and means effective at the end of the timing period for reoperating said relay to dismiss the call by removing said potential from said sleeve conductor.

26. In a telephone system, a calling line, a called line, a finder circuit for finding said calling line, a connector circuit for completing a connection to said called line, means for extending a connection between said lines including said finder and said connector circuits, each of said circuits including a switch comprising banks of contacts and contact brushes, a source of timing pulses, and means for timing out said extended connection, said timing out means including a first circuit including said source and one of said connector brushes for conducting timing pulses directly to said connector circuit and a second circuit including said source, one of said finder brushes and said extended connection for conducting timing pulses indirectly to said connector circuit, and means for dismissing said extended circuit after a predetermined number of timing pulses is received in said connector.

27. In a telephone system, a calling line, a calling line, a called line, and means for extending a connection between said lines, a busy test relay for preventing said extension if said called line is busy and for permitting said extension if said called line is idle, means for ringing said called line, conversation timing means, means responsive to the called line being answered to terminate ringing, means responsive to the termination of ringing to operate said busy test relay, and additional means responsive to the called line being answered and the operation of said busy test relay for initiating operation of said conversation timing means.

28. In a telephone system, a plurality of lines, means for extending a connection between two of said lines, a busy test relay for preventing said extension if the called line is busy and for permitting said extension if said called line is idle, means for ringing said called line, conversation timing means, means responsive to the called line being answered to terminate ringing, means responsive to the termination of ringing to operate said busy test relay, and additional means responsive to the called line being answered and the operation of said busy test relay for initiating operation of said conversation timing means, and means effective on calls involving certain of said lines for limiting operation of said timing means.

29. In a telephone system, a plurality of lines, means for extending a connection between two of said lines, a busy test relay, means for energizing said relay when a busy condition is encountered on the called line to prevent extension of said connection but permitting said relay to be de-energized if the called line is idle to extend said connection thereto, means for ringing the called line, conversation timing means, means responsive to answering the extended call to terminate ringing, means responsive to the termination of ringing to operate said busy test relay, and additional means responsive to the called line being answered and the operation of said busy test relay for initiating operation of said conversation timing means, and means effective on calls involving certain of said lines for preventing operation of said timing means.

30. In a telephone system, groups of calling and called lines, means for extending a connection between a called and a calling line, a relay responsive to a busy condition on the called line to prevent said extension but responsive to an idle condition of the called line for enabling said extension, directively controlled means for ringing the called line, means for restoring said controlled means to its normal position when the call is answered, a source of timing pulses, means responsive to the answering of the call and the restoration of said controlled means for energizing said relay to conduct timing pulses to said controlled means when said extending means is positioned corresponding to one group of lines, and means responsive to said extending means being positioned corresponding to another group of lines for preventing reoperation of said controlled means.

31. In a telephone system, a calling line, a called line, means including a step switch for connecting said lines, and a busy test relay for determining whether said called line is busy or idle, said relay being connected to be energized when the called line is found busy but deenergized when found idle, said relay also being effective to enable said connection to be completed when said relay is de-energized, directively operated means responsive to the de-energized condition of said relay for applying ringing current to the called line in response to the receipt of a ringing digit from the calling line, release circuit means responsive to answering of the call for returning said directively operated means to its home position and for removing said ringing current from said called line, means responsive to said directively operated means reaching its home position for re-energizing said relay in order to maintain open said release circuit, a source of timing pulses, a circuit utilizing said pulses for re-operating said directively operated means to impress timing signals on said lines whenever said step switch is in a position corresponding to lines equipped for conversation timing and for preventing re-operation of said directively operated means when said switch is in a position corresponding to lines with respect to which conversation timing is not desired.

32. In a telephone system, a calling line, a called line, means including a step switch for connecting said lines, and a busy test relay for determining whether said called line is busy or idle, said relay being connected to be energized when the called line is found busy but de-energized when found idle, said relay also being effective to enable said connection to be completed when said relay is de-energized, directively operated means responsive to the de-energized condition of said relay for applying ringing current to the called line in response to the receipt of a ringing digit from the calling line, release circuit means responsive to answering of the call for returning said directively operated means to its home position and for removing said ringing current from said called line, means responsive to said directively operated means reaching its home position for re-energizing said relay in order to maintain open said release circuit, a source of timing pulses, a circuit utilizing said pulses for re-operating said directively operated means to impress timing signals on said lines whenever said step switch is in a position corresponding to lines equipped for conversation timing and for preventing re-operation of said directively operated means when said switch is in a position corresponding to lines with respect to which conversation timing is not desired, said last mentioned circuit including resistance means having a sufficiently low cold resistance to permit timing pulses to pass relatively unimpeded but a sufficiently high hot resistance to limit the current in said last-mentioned circuit.

33. In a telephone system, a calling line, a called line, means including a step switch for connecting said lines, and a busy test relay for determining whether said called line is busy or idle, said relay being connected to be energized when the called line is found busy but de-energized when found idle, said relay also being effective to enable said connection to be completed when said relay is de-energized, directively operated means responsive to the de-energized condition of said relay for applying ringing current to the called line in response to the receipt of a ringing digit from the calling line, release circuit means responsive to answering of the call for returning said directively operated means to its home position and for removing said ringing current from said called line, means responsive to said directively operated means reaching its home position for re-energizing said relay in order to maintain open said release circuit, a source of timing pulses, a circuit utilizing said pulses for re-operating said directively operated means to impress timing signals on said lines whenever said step switch is in a position corresponding to lines equipped for conversation timing and for preventing re-operation of said directively operated means when said switch is in a position corresponding to lines with respect to which conversation timing is not desired, said last-mentioned circuit including resistance means having a thermal coefficient of resistance such that current of relatively high value is permitted to pass for energizing said directively operated means but the current is thereafter reduced sufficiently to maintain energized said directively operated means while not exceeding a safe value with respect to continuous energization.

34. In a telephone system having a called line, a called station, a calling line, a calling station including means for transmitting a series of pulses corresponding to the called station, means for finding the calling line in response to a calling condition on said calling line and for extending said calling line, a connector including a first directively operated step switch for connecting said extended calling line and said called line in response to the receipt of said pulses, a busy test relay for determining whether said called line is busy or idle, a second directively operated step switch having a first operating circuit for causing said second switch to move to a position to apply ringing current to said called line, and an answering relay energized when the called station answers, a release circuit for returning said second switch to its home position and for removing ringing current from said called line when the called station answers, means for re-operating said busy test relay after the operation of said answering relay, means including said busy test relay for maintaining open said release circuit for said second step switch after re-energization of said busy test relay, a second operating circuit for said second switch including contacts of said busy test relay, contacts of said answering relay and a ballast resistance, a source of timing pulses, means utilizing said finding means and also said first step switch for introducing said timing pulses into said second circuit when said first switch is positioned on a predetermined level in order to step said second switch, means for applying a steady potential to said second circuit through said first step switch when said first step switch is positioned at another level whereby said second switch advances one step and is then held at that position, said ballast resistance having a thermal coefficient of resistance such that the timing pulses readily pass therethrough but the resistance is effective under the condition of steady potential to limit the flow of current in said second operating circuit.

35. In a telephone system, a plurality of subscribers' lines, a plurality of finder-selector links for finding a calling subscriber's line, means for allotting one of said links to each call, each finder and each selector including a step-by-step switch, each switch having a normally closed off-normal contact corresponding to movement in each direction and which is caused to open by movement of said switch in its said respective directions, means for releasing said switches to their normal positions after a stepping operation, said releasing means including a contact which is closed during the stepping of said switch, and means for testing for an idle link, the last-mentioned means comprising a step switch having a movable brush and a plurality of bank contacts for testing the idle condition of said links, each bank contact being connected to a different link, and a series circuit including said movable brush and a contact of said step switch, a source of potential, a relay, and the selector and finder off-normal contacts of the link being tested, and means for causing movement of said brush successively to engage said bank contacts whereby said relay is energized whenever said brush engages a bank contact corresponding to an idle link.

36. In a telephone system, a plurality of subscribers' lines, a plurality of finder-selector links for finding a calling subscriber's line, means for allotting one of said links to each call, each finder and each selector including a step-by-step switch, each switch having a normally closed off-normal contact corresponding to movement in each direction and which is caused to open by movement of said switch in its said respective directions, means for releasing said switches to their normal positions after a stepping operation, said releasing means including a contact which is closed during the stepping of said switch, and means for testing for an idle link, the last-mentioned means comprising a step switch having a movable brush and a plurality of bank contacts for testing the idle condition of said links, each bank contact being connected to a different link, and a series circuit including said movable brush and a contact of said step switch, a source of potential, a relay, and the selector and finder release contacts of the link being tested, and means for causing movement of said brush successively to engage said bank contacts whereby said relay is energized whenever said brush engages a bank contact corresponding to an idle link.

37. In a telephone system, a plurality of subscribers' lines, a plurality of finder-selector links for finding a calling subscriber's line, means for allotting one of said links to each call, each finder and each selector including a step-by-step switch, each switch having a normally closed off-normal contact corresponding to movement in each direction and which is caused to open by movement of said switch in its said respective directions, means for releasing said switches to their normal positions after a stepping operation, said releasing means including a contact which is closed during the stepping of said switch, and means for testing for an idle link, the last-mentioned means comprising a step switch having a movable brush and a plurality of bank contacts for testing the idle condition of said links, each bank contact being connected to a different link, and a series circuit including said movable brush and a contact of said step switch, a source of potential, a relay, one of said release contacts and one of said off-normal contacts of the link being tested, and means for causing movement of said brush successively to engage said bank contacts whereby said relay is energized whenever said brush engages a bank contact corresponding to an idle link.

38. In a telephone system, a plurality of subscribers' lines, a plurality of finder-selector links for finding a calling subscriber's line, means for allotting one of said links to each call, each finder and each selector including a step-by-step switch, each switch having a normally closed off-normal contact corresponding to movement in each direction and which is caused to open by movement of said switch in its said respective directions, means for releasing said switches to their normal positions after a stepping operation, said releasing means including a contact which is closed during the stepping of said switch, and means for testing for an idle link, the last-mentioned means comprising a step switch having a movable brush and a plurality of bank contacts for testing the idle condition of said links, each bank contact being connected to a different link, and a series circuit including said movable brush and a contact of said step switch, a source of potential, a relay, one of said off-normal contacts of the link being tested, and means for causing movement of said brush successively to engage said bank contacts whereby said relay is energized whenever said brush engages a bank contact corresponding to an idle link.

39. In combination with a switch device having a set of contact brushes positioned responsive to a primary stepping movement and a secondary stepping movement, and an auxiliary contact brush positioned only according to said primary stepping movement, means utilizing said auxiliary brush for limiting the secondary stepping movement whenever said primary stepping movement is positioned at a dead level, and means for transmitting a tone to apprise a subscriber causing operation of said device that said device is positioned at a dead level, said last-mentioned means comprising a second auxiliary contact brush set positioned similarly to the position of the first mentioned auxiliary set.

40. In a telephone system, a plurality of lines, a finder circuit for finding a calling one of said lines, a connector circuit for completing a connection from said calling line to a called line, each circuit including a two motion switch, each switch comprising a set of contact brushes adapted to be positioned responsive to a primary stepping movement and a secondary stepping movement, said finder and said connector switches each having an auxiliary contact brush adapted to be positioned according to said primary stepping movement, means for timing the conversation period on certain of said lines, the remaining lines being entitled to unlimited conversation time, a source of potential, a step switch, a first circuit for periodically connecting said step switch through the connector auxiliary brush set to said source of potential and a second circuit for also periodically connecting said step switch to said source of potential through the finder auxiliary brush set and the completed connection whereby said step switch is caused to step to time a completed connection including one of said certain lines, means for dismissing the completed connection to or from said certain lines after a predetermined number of steps of said step switch, and means for connecting said step switch directly to said source of potential through at least one of said auxiliary brushes when the completed connection includes one of the remaining of said lines.

FRANK A. MORRIS.

REFERENCES CITED

The following references are of record in the file of this patent:

UNITED STATES PATENTS

| Number | Name | Date |
|---|---|---|
| 1,456,507 | Lundell | May 29, 1923 |
| 1,628,358 | Friendly | May 10, 1927 |
| 1,688,162 | Stehlik | Oct. 16, 1928 |
| 1,850,608 | Stokely | Mar. 22, 1932 |
| 2,037,221 | Evers | Apr. 14, 1936 |
| 2,052,051 | Lomax | Aug. 25, 1936 |
| 2,133,415 | Baker et al. | Oct. 18, 1938 |
| 2,148,824 | Lienzen | Feb. 28, 1939 |
| 2,149,646 | Voss | Mar. 7, 1939 |
| 2,218,848 | Lomax | Oct. 22, 1940 |
| 2,218,850 | Mahoney | Oct. 22, 1940 |
| 2,239,902 | Peterson | Apr. 29, 1941 |
| 2,291,496 | Newstedt | July 28, 1942 |
| 2,312,427 | Lomax | Mar. 2, 1943 |
| 2,333,474 | Denton et al. | Nov. 2, 1943 |
| 2,340,555 | Peterson | Feb. 1, 1944 |
| 2,389,290 | Bakker | Nov. 20, 1945 |

FOREIGN PATENTS

| Number | Country | Date |
|---|---|---|
| 54,223 | Netherlands | Apr. 15, 1943 |